US012355270B2

(12) United States Patent
Lim et al.

(10) Patent No.: US 12,355,270 B2
(45) Date of Patent: Jul. 8, 2025

(54) ELECTRONIC DEVICE INCLUDING COIL ANTENNA AND MAGNET

(71) Applicant: SAMSUNG ELECTRONICS CO., LTD., Suwon-si (KR)

(72) Inventors: Jaedeok Lim, Suwon-si (KR); Hyein Park, Suwon-si (KR); Jaehyoung You, Suwon-si (KR); Woosup Lee, Suwon-si (KR); Taejun Lim, Suwon-si (KR); Gyuyeong Cho, Suwon-si (KR); Hana Choe, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 527 days.

(21) Appl. No.: 17/883,614

(22) Filed: Aug. 9, 2022

(65) Prior Publication Data

US 2023/0063734 A1    Mar. 2, 2023

Related U.S. Application Data

(63) Continuation of application No. PCT/KR2022/009619, filed on Jul. 4, 2022.

(30) Foreign Application Priority Data

Aug. 25, 2021   (KR) .................. 10-2021-0112162
Nov. 23, 2021   (KR) .................. 10-2021-0162519

(51) Int. Cl.
*H02J 50/70*     (2016.01)
*H01F 27/28*     (2006.01)
(Continued)

(52) U.S. Cl.
CPC ............ *H02J 50/70* (2016.02); *H01F 27/288* (2013.01); *H01F 27/361* (2020.08);
(Continued)

(58) Field of Classification Search
CPC .. H02J 50/70; H02J 50/10; H02J 50/27; H02J 50/005; H01F 27/361; H01F 27/288
(Continued)

(56) References Cited

U.S. PATENT DOCUMENTS 5,889,384 A * 3/1999 Hayes ................. H02J 50/10
                                              320/108
7,495,414 B2 * 2/2009 Hui ..................... H02J 7/00
                                              320/108

(Continued)

FOREIGN PATENT DOCUMENTS

KR   10-2015-0076143 A    7/2015
KR   10-2016-0135939 A    11/2016
(Continued)

OTHER PUBLICATIONS

International Search Report mailed Oct. 13, 2022 for PCT/KR2022/009619.

*Primary Examiner* — Alfonso Perez Borroto
(74) *Attorney, Agent, or Firm* — CANTOR COLBURN LLP

(57) ABSTRACT

A power reception device includes: a housing including a first surface facing in a first direction, a second surface facing in a second direction opposite to the first direction, and a side surface surrounding a space between the first surface and the second surface; a coil antenna wound in a circle; a shielding sheet disposed over the coil antenna; and a first magnet and a second magnet adjacent to an outermost coil of the coil antenna and disposed to be spaced apart from the outermost coil. The first magnet is disposed so that a portion of magnetism induced by the first magnet is formed in the first direction. The second magnet is disposed so that a portion of the magnetism induced by the second magnet is formed in a third direction that is an outside direction from a center of the coil antenna.

20 Claims, 23 Drawing Sheets

(51) Int. Cl.
  *H01F 27/36* (2006.01)
  *H02J 50/00* (2016.01)
  *H02J 50/10* (2016.01)
  *H02J 50/27* (2016.01)

(52) U.S. Cl.
  CPC .......... *H02J 50/005* (2020.01); *H02J 50/10* (2016.02); *H02J 50/27* (2016.02)

(58) Field of Classification Search
  USPC ..................................................... 307/104
  See application file for complete search history.

(56) References Cited

U.S. PATENT DOCUMENTS

| | | | |
|---|---|---|---|
| 7,952,322 B2* | 5/2011 | Partovi | H01F 5/003 |
| | | | 320/108 |
| 8,294,418 B2* | 10/2012 | Hui | H02J 50/12 |
| | | | 320/108 |
| 8,405,346 B2* | 3/2013 | Trigiani | H02J 50/80 |
| | | | 320/108 |
| 8,688,037 B2 | 4/2014 | Chatterjee et al. | |
| 8,766,484 B2 | 7/2014 | Baarman et al. | |
| 10,283,998 B2 | 5/2019 | Hong | |
| 10,333,358 B2 | 6/2019 | Bae et al. | |
| 10,424,962 B2 | 9/2019 | Graham et al. | |
| 11,710,989 B2 | 7/2023 | Thompson et al. | |
| 2010/0207771 A1* | 8/2010 | Trigiani | H02J 50/005 |
| | | | 320/108 |
| 2011/0221387 A1* | 9/2011 | Steigerwald | B60L 53/38 |
| | | | 320/108 |
| 2012/0235636 A1* | 9/2012 | Partovi | H02J 7/0042 |
| | | | 320/108 |
| 2013/0285604 A1* | 10/2013 | Partovi | H02J 7/0044 |
| | | | 320/108 |
| 2016/0105047 A1 | 4/2016 | Cui | |
| 2020/0373784 A1 | 11/2020 | Yun et al. | |

FOREIGN PATENT DOCUMENTS

| | | |
|---|---|---|
| KR | 10-2019-0088955 A | 7/2019 |
| KR | 10-2048178 B1 | 12/2019 |
| KR | 10-2020-0133513 A | 11/2020 |

\* cited by examiner

[1610]

[1630]

[1650]

ELECTRONIC DEVICE INCLUDING COIL ANTENNA AND MAGNET

TECHNICAL FIELD

Various embodiments of the disclosure relate to an electronic device including a coil antenna and a magnet.

BACKGROUND ART

An electronic device may be equipped with a coil supporting wireless charging. The electronic device may be equipped with a magnet disposed around the coil. For example, if the electronic device is disposed in an attached type wireless charger (or a holder in a vehicle) for charging, the magnet may be disposed in the state in which the electronic device is arranged with the attached type wireless charger (or a holder in a vehicle).

DISCLOSURE OF INVENTION

Technical Problem

If the magnet is disposed around the coil supporting wireless charging, a magnetic field may be formed in a direction toward the outside of the electronic device. If the electronic device is disposed in a common wireless charger not the attached type wireless charger, interference with a magnetic shielding sheet of the coil may occur because a magnetic field is formed in a direction toward the outside of the electronic device. Accordingly, it may be difficult to maintain a charging state and heat generation may occur.

Solution to Problem

An electronic device according to various embodiments of the disclosure may be equipped with a magnet disposed around a coil and having a perpendicular shape magnetism structure. For example, the magnet may include a first magnet disposed in a part adjacent to the coil and forming a magnetic field in a first direction perpendicular to a shielding sheet of the coil and a second magnet forming a magnetic field in a second direction perpendicular to the first direction.

A power reception device according to various embodiments of the disclosure includes: a housing including a first surface facing in a first direction, a second surface facing in a second direction opposite to the first direction, and a side surface surrounding a space between the first surface and the second surface; a coil antenna disposed in an internal space of the housing, configured to wirelessly receive power from a power transmission device, and wound in a circle; a shielding sheet disposed over the coil antenna; and a first magnet and a second magnet adjacent to an outermost coil of the coil antenna and disposed to be spaced apart from the outermost coil. The first magnet is disposed so that a portion of magnetism induced by the first magnet is formed in the first direction. The second magnet is coupled with the first magnet in a third direction that is an outside direction from a center of the coil antenna and is disposed so that a portion of the magnetism induced by the second magnet is formed in the third.

A power transmission device according to various embodiments of the disclosure may include: a housing including a first surface facing in a first direction, a second surface facing in a second direction opposite to the first direction, and a side surface surrounding a space between the first surface and the second surface; a coil antenna disposed in an internal space of the housing, configured to wirelessly transmit power to a power reception device, and wound in a circle; a shielding sheet disposed under the coil antenna; and a first magnet and a second magnet adjacent to an outermost coil of the coil antenna and disposed to be spaced apart from the outermost coil. The first magnet is disposed so that a portion of magnetism induced by the first magnet is formed in the first direction. The second magnet is coupled with the first magnet in a third direction that is an outside direction from a center of the coil antenna and may be disposed so that a portion of the magnetism induced by the second magnet is formed in a fourth direction that is opposite to the third direction.

Advantageous Effects of Invention

The electronic device according to various embodiments of the disclosure may improve charging efficiency by including the first magnet forming a magnetic field in a first direction perpendicular to the shielding sheet disposed in a part adjacent to the coil and the second magnet forming a magnetic field in a second direction perpendicular to the first direction so that the electronic device and the wireless charger are disposed in a way to be arranged.

MODE FOR THE INVENTION

Figure 1:
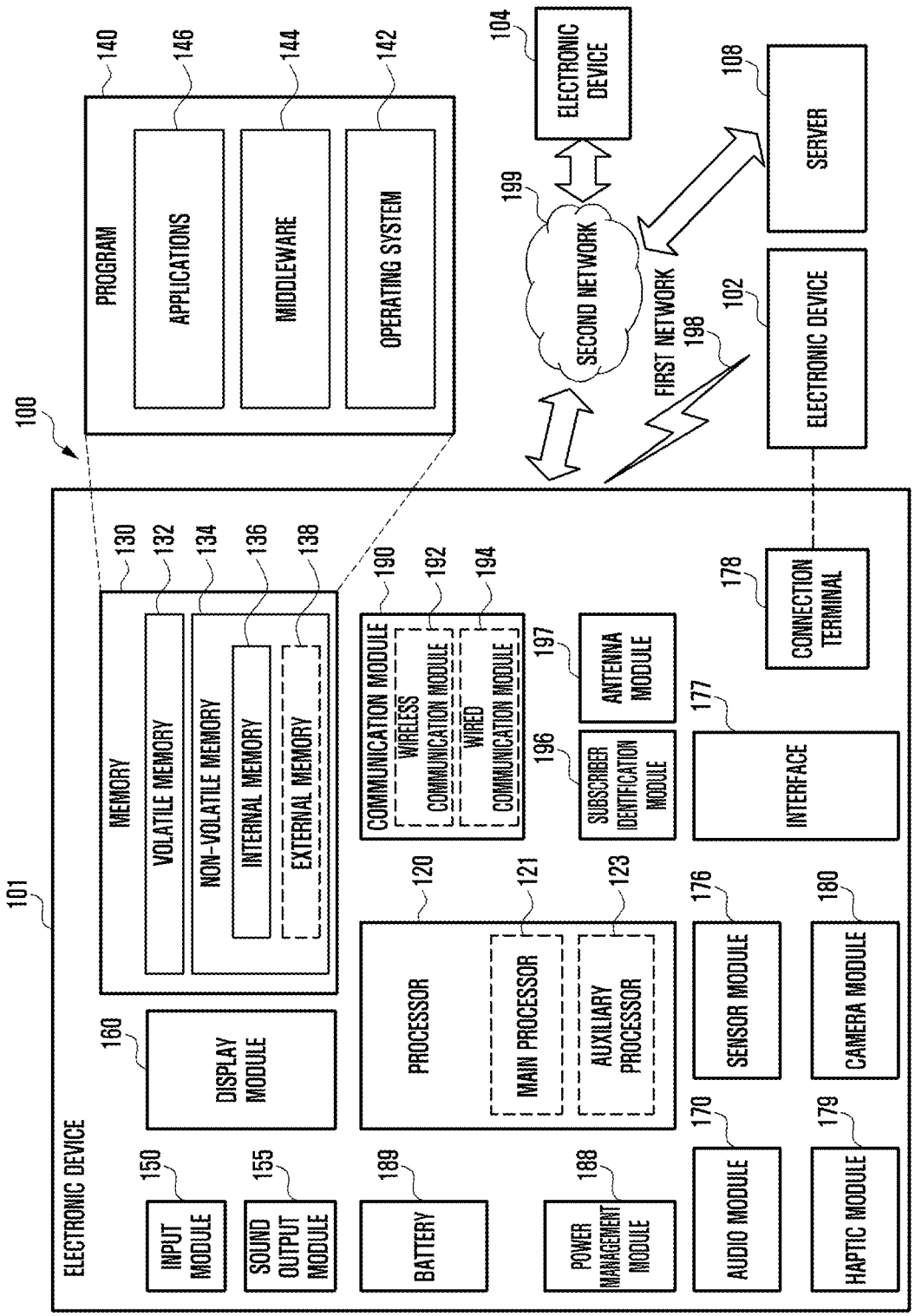
FIG. 1 is a block diagram of an electronic device within a network environment according to various embodiments.

FIG. 1 is a block diagram illustrating an electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
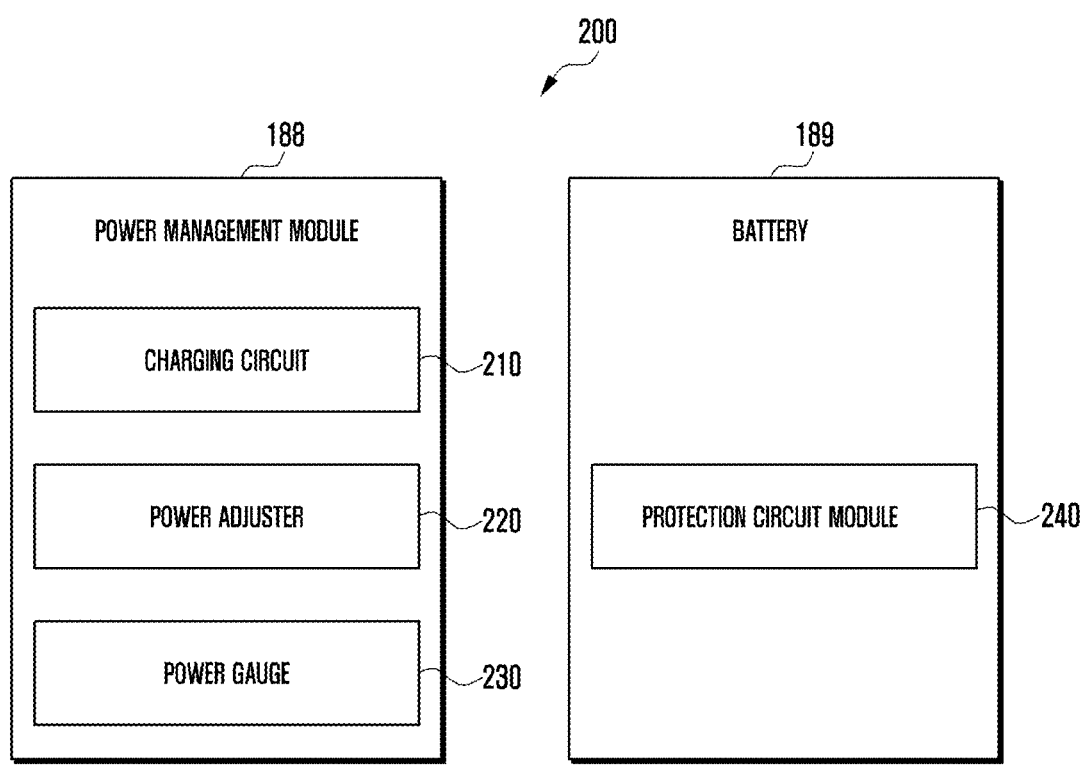
FIG. 2 is a block diagram of the power management module and the battery according to various embodiments.

FIG. 2 is a block diagram 200 illustrating the power management module 188 and the battery 189 according to various embodiments.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3A:
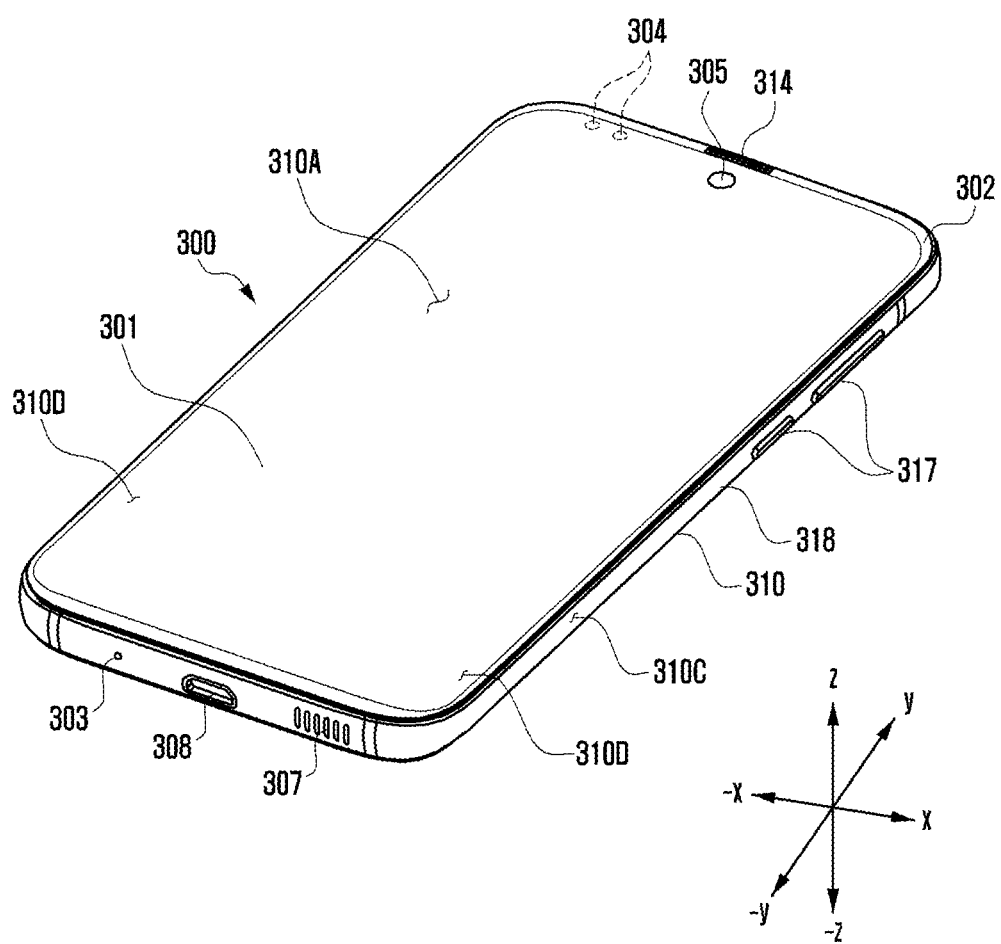
FIG. 3A is a perspective view of a front surface of the electronic device according to various embodiments.
Figure 3B:
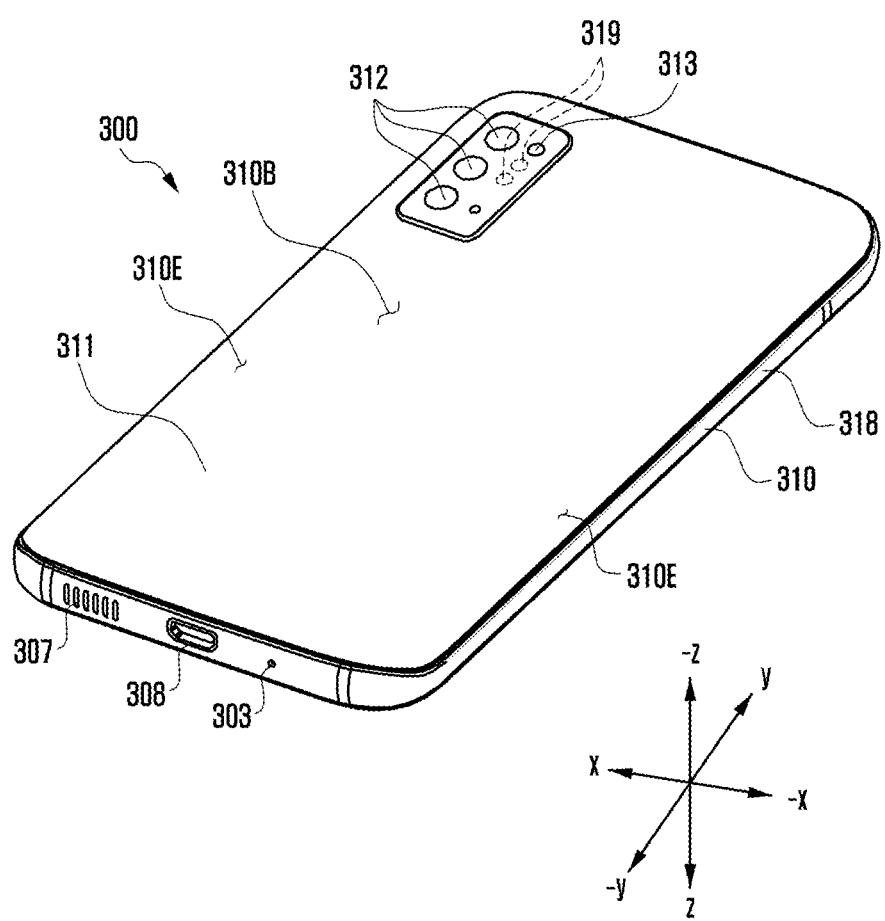
FIG. 3B is a perspective view of a back surface of the electronic device in FIG. 3A according to various embodiments.

FIG. 3A illustrates a perspective view showing a front surface of an electronic device 300, according to an embodiment. FIG. 3B illustrates a perspective view showing a rear surface of the electronic device 300 shown in FIG. 3A, according to an embodiment.

The electronic device 300 shown in FIGS. 3A and 3B may be similar, at least in part, to the electronic device 101 in FIG. 1, or may further include another embodiment of the electronic device.

Referring to FIGS. 3A and 2B, an electronic device 300 includes a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The electronic device 300 may include at least one of a display 301, an input device 303, sound output devices 307 and 314, sensor modules 304 and 319, camera modules 305, 312, and 313, a key input device 317, an indicator, and a connector hole 308. The electronic device 300 may omit at least one (e.g., the key input device 317 or the indicator) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. The display 301 may be combined with, or adjacent to, a touch sensing circuit, a pressure sensor capable of measuring the touch strength (pressure), and/or a digitizer for detecting a stylus pen. At least a part of the sensor modules 304 and 319 and/or at least a part of the key input device 317 may be disposed in the first region 310D and/or the second region 310E.

The input device 303 may include a microphone. In some embodiments, the input device 303 may include a plurality of microphones arranged to sense the direction of the sound. The sound output devices 307 and 314 may include speakers. The speakers may include an external speaker and a receiver for a call. In some embodiments, the microphone, the speakers, and the connector hole 308 are disposed in the space of the electronic device 300 and may be exposed to the external environment through at least one hole formed in the housing 310. A hole formed in the housing 310 may be used in common for the microphone and speakers. The sound output devices may include a speaker (e.g., a piezo speaker) that operates while excluding a hole formed in the housing 310.

The sensor modules 304 and 319 may generate electrical signals or data corresponding to an internal operating state of the electronic device 300 or to an external environmental condition. The sensor modules 304 and 319 may include a first sensor module (e.g., a proximity sensor), a second sensor module (e.g., a fingerprint sensor) disposed on the first surface 310A of the housing 310, a third sensor module (e.g., a heart rate monitor (HRM) sensor), and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an IR sensor, a biometric sensor, a temperature sensor, a humidity sensor, or an illuminance sensor.

The camera modules 305, 312, and 313 may include a first camera device (e.g., camera module) disposed on the first surface 310A of the electronic device 300, and a second camera device and/or a flash disposed on the second surface 310B. The camera module 305 or the camera module 312 may include one or more lenses, an image sensor, and/or an ISP. The flash 313 may include, for example, a light emitting diode (LED) or a xenon lamp. Two or more lenses (e.g., wide angle and telephoto lenses) and image sensors may be disposed on one side of the electronic device 300.

The key input device 317 may be disposed on the lateral surface 310C of the housing 310. The electronic device 300 may not include some or all of the components of the key input device 317 described above, and the components of the key input device 317 which are not included may be implemented in another form such as a soft key on the display 301. The key input device 317 may include the sensor module disposed on the second surface 310B of the housing 310. Additionally or alternatively, the key input device 317 may be implemented using a pressure sensor included in the display 301.

The indicator may be disposed on the first surface 310A of the housing 310. For example, the indicator may provide status information of the electronic device 300 in an optical form. The indicator (e.g., an LED) may provide a light source associated with the operation of the camera module 305. The indicator may include, for example, an LED, an IR LED, or a xenon lamp.

The connector hole 308 may include a first connector hole 308 adapted for a connector (e.g., a USB connector) for transmitting and receiving power and/or data to and from an external electronic device. The connector hole 308 may include a second connector hole adapted for a connector (e.g., an earphone jack) for transmitting and receiving an audio signal to and from an external electronic device.

Some camera modules of camera modules 305 and 312, some sensor modules of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. The area facing the camera module 305 of the display 301 may be formed as a transparent area having a designated transmittance as a part of an area displaying content. The transmissive region may have a transmittance ranging from about 5% to about 20%. Such a transmissive region may include a region overlapping an effective region (e.g., an angle of view region) of the camera module 305 through which light for generating an image by an image sensor passes. The transparent area of the display 301 may include an area having a lower pixel density or wiring density or both than the surrounding area. The transmissive area may replace the aforementioned opening. The camera module 305 may include an under-display camera (UDC). The sensor module 304 may be arranged to perform functions without being visually exposed through the display 301 in the internal space of the electronic device 300. For example, in this case, an area of the display 301 facing the sensor module may not require a perforated opening.

Figure 4:
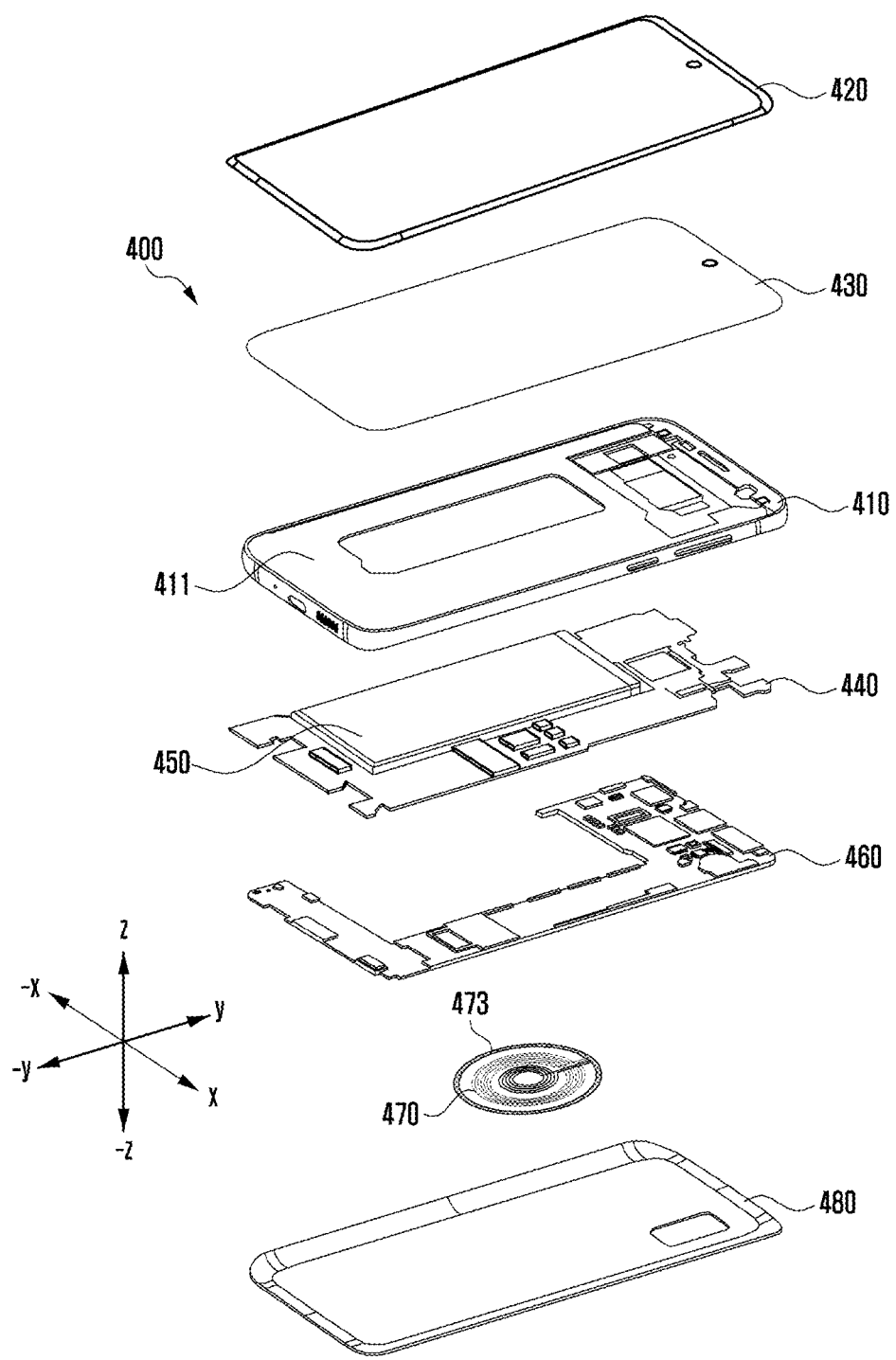
FIG. 4 is an exploded perspective view of the electronic device according to various embodiments.

FIG. 4 illustrates an exploded perspective view showing an electronic device 400, according to an embodiment.

The electronic device 400 shown in FIG. 4 may be similar, at least in part, to the electronic device 101 in FIG. 1, or to the electronic device 300 in FIGS. 3A and 3B, and may further include another embodiment of the electronic device.

Referring to FIG. 4, an electronic device 400 includes a lateral bezel structure 410, a first support member 411 (e.g., a bracket or a support structure), a front plate 420 (e.g., a front cover), a display 430, a PCB 440, a battery 450, a second support member 460 (e.g., a rear case), a flexible PCB (FPCB) 470, and a rear plate 480 (e.g., a rear cover or back surface plate). The electronic device 400 may omit at least one of the above components (e.g., the first support member 411 or the second support member 460) or may further include another component. Some components of the electronic device 400 may be the same as or similar to those of the electronic device 300 shown in FIG. 3A or FIG. 3B, thus, descriptions thereof are omitted below.

The first support member 411 is disposed inside the electronic device 400 and may be connected to, or integrated with, the lateral bezel structure 410. The first support member 411 may be formed of, for example, a metallic material and/or a non-metal (e.g., polymer) material. The first support member 411 may be combined with the display 430 at one side thereof and also combined with the PCB 440 at the other side thereof. A processor 120, a memory 130, and/or an interface 177 may be mounted on the PCB 440.

The processor may include, for example, one or more of a CPU, an AP, a GPU, an ISP, a sensor hub processor, or a CP.

The memory may include, for example, one or more of a volatile memory 132 and a non-volatile memory 134.

The interface may include, for example, an HDMI, a USB interface, an SD card interface, and/or an audio interface. The interface may electrically or physically connect the electronic device 400 with an external electronic device and may include a USB connector, an SD card/multimedia card (MMC) connector, or an audio connector.

The battery 450 is a device for supplying power to at least one component of the electronic device 400, and may include, for example, a non-rechargeable primary battery, a rechargeable secondary battery, or a fuel cell. At least a part of the battery 450 may be disposed on substantially the same plane as the PCB 440. The battery 450 may be integrally disposed within the electronic device 400, and may be detachably disposed from the electronic device 400.

The electronic device 400 may include a coil antenna 470 wound in a circle. For example, the coil antenna 470 may be disposed (e.g., attached to the back surface plate 480) between the back surface plate 480 and the second support member 460. The coil antenna 470 may include a magnetic secure transmission (MST) antenna, a near field communication (NFC) antenna and/or a wireless charging antenna. The coil antenna 470 may perform short-distance communication with an external electronic device or may wirelessly transmit and receive power for charging, for example. In other embodiments, an antenna structure may be formed by a part of the side surface bezel structure 410 and/or the first support member 411 or a combination of them.

In various embodiments, the electronic device 400 may include a plurality of magnets 473 disposed in a way to be adjacent to the coil antenna 470. For example, the plurality of magnets 473 may be disposed in a form surrounding the outermost coil in a way to be adjacent to the outermost coil of the coil antenna 470.

The coil antenna 470 and the plurality of magnets 473 of the power reception device 520 according to various embodiments will be specifically described with reference to FIGS. 6A, 6B, and 6C described later.

Figure 5:
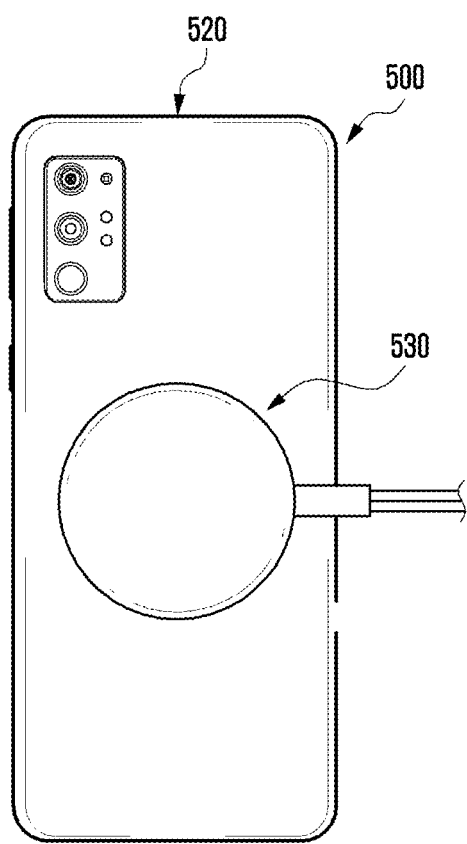
FIG. 5 is a diagram schematically describing an operation of charging, by a power transmission device, a power reception device according to various embodiments.

FIG. 5 is a diagram 500 schematically describing an operation of charging, by a power transmission device 530, a power reception device 520 according to various embodiments.

With reference to FIG. 5, the power transmission device 530 may charge the power reception device 520 by wirelessly transmitting power. For example, if a state of a battery (e.g., the battery 189 in FIG. 1) of the power reception device 520 is the state in which the battery has been discharged or the amount of available power is less than a designated level, the power transmission device 530 may charge the battery 189 of the power reception device 520 by wirelessly transmitting power.

In various embodiments, the power reception device 520 in FIG. 5 may include the electronic device 101 disclosed in FIG. 1 (or the electronic device 300 in FIGS. 3A and 3B or the electronic device 400 in FIG. 4). For example, the power reception device 520 may include at least one of a smartphone, a wearable device (e.g., a watch), or a tablet. The power transmission device 510 may be a device identical with or similar to the power reception device 520. For example, the power transmission device 530 may include a wireless charging pad, a tablet, or a smartphone. The power transmission device 530 may be implemented by at least one of the electronic devices 101, 102 and/or 104 disclosed in FIG. 1. The power transmission device 530 may include one or more of the constituent elements of the electronic device 101 disclosed in FIG. 1.

In various embodiments, the power transmission device 530 may have a circular housing, but the disclosure is not limited thereto, the power transmission device 530 may have a square, rectangular or oval housing in another embodiment. The power transmission device 530 may include a coil antenna disposed in an internal space of the housing of the power transmission device. The power transmission device 530 may include a plurality of magnets adjacent to the outermost coil of the coil antenna and disposed to be spaced apart from the outermost coil.

The coil antenna and the plurality of magnets of the power transmission device 530 according to various embodiments will be specifically described with reference to FIG. 6D described later.

Figure 6A:
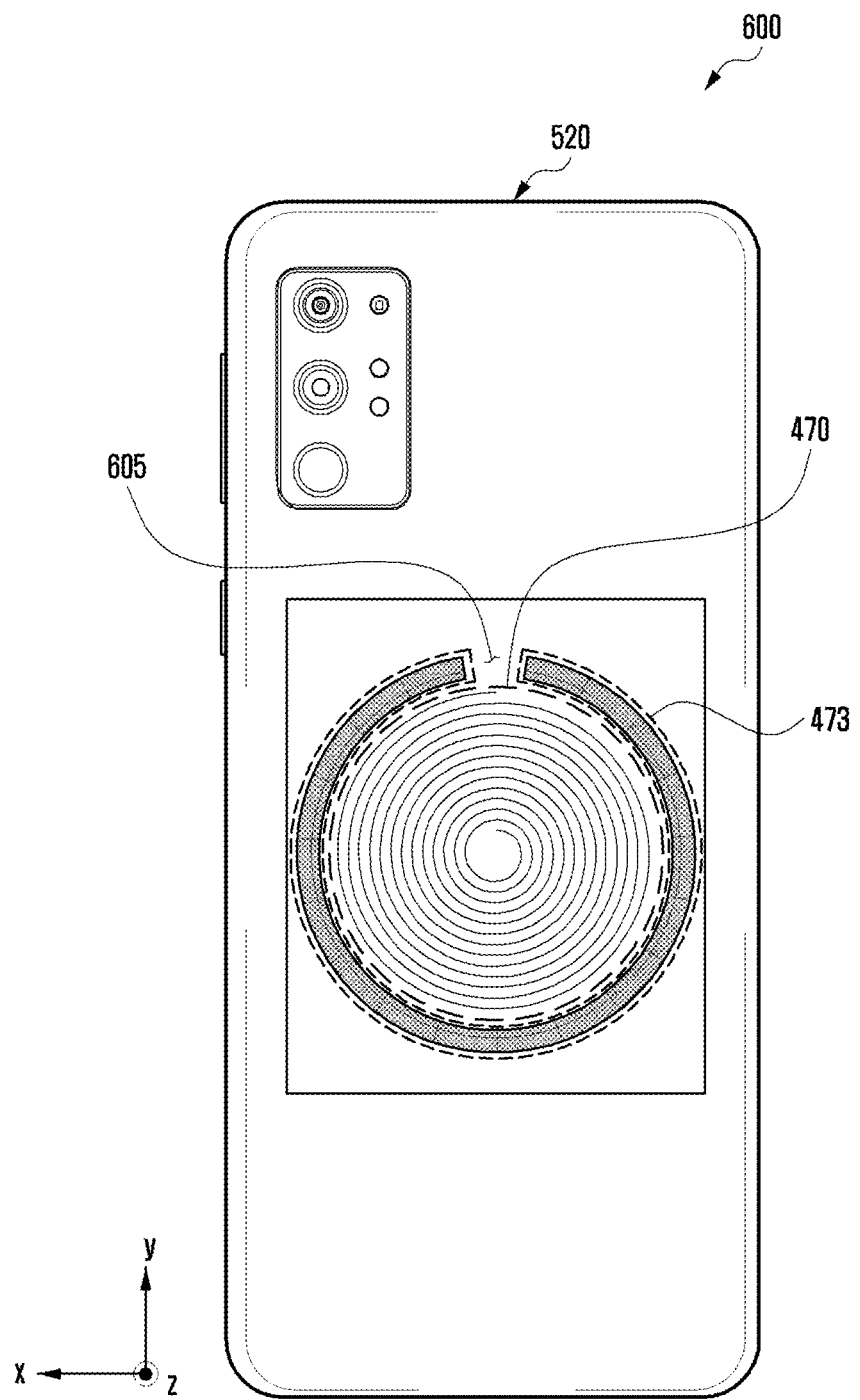
FIGS. 6A, 6B, and 6C are diagrams illustrating a coil antenna and a plurality of magnets disposed in an internal space of a power reception device according to various embodiments.
Figure 6B:
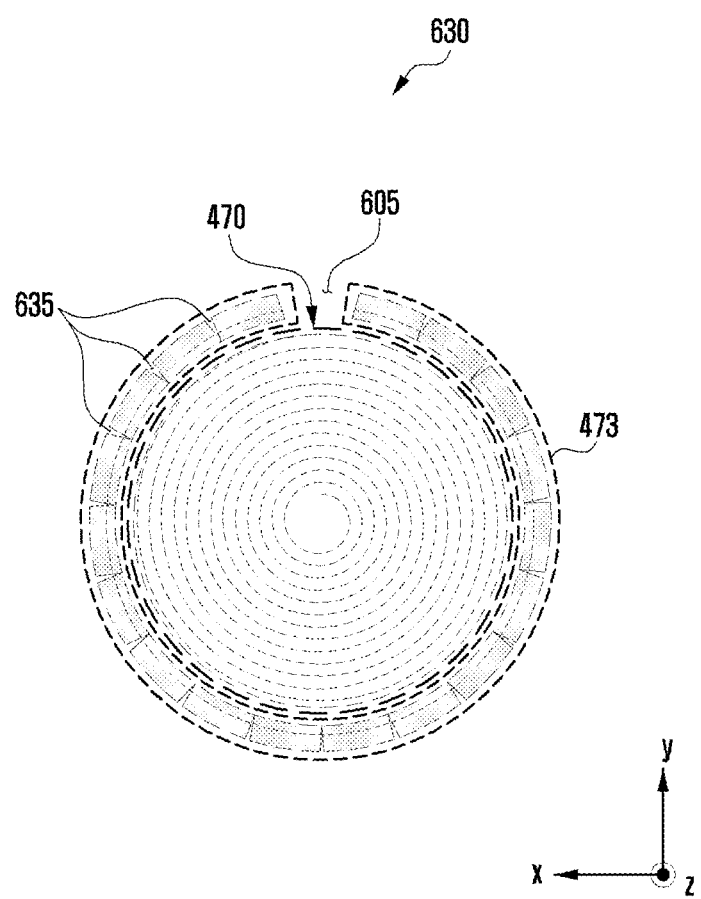
Figure 6C:
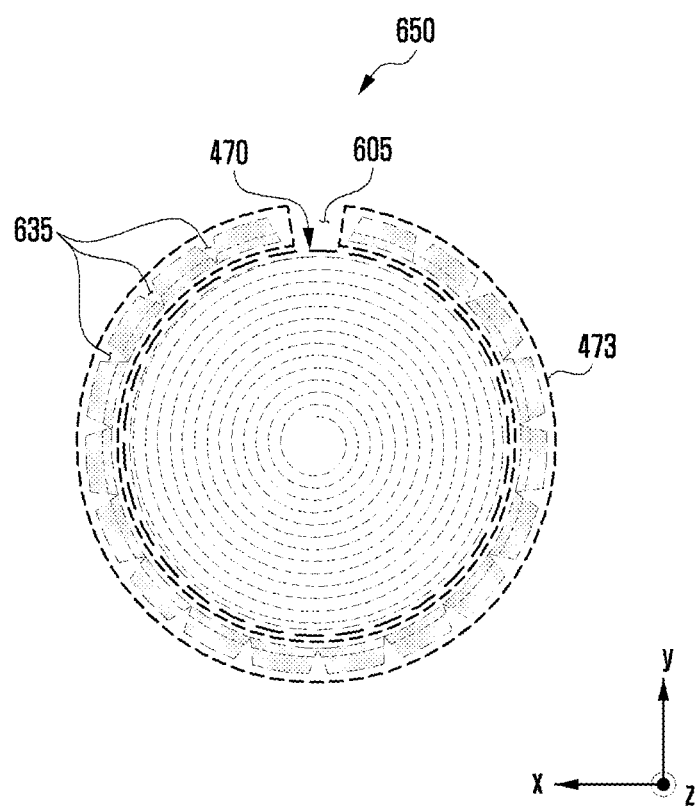

FIGS. 6A, 6B, and 6C are diagrams 600, 630, and 650 illustrating the coil antenna 470 and the plurality of magnets 473 disposed in an internal space of a power reception device 520 according to various embodiments.

With reference to FIG. 6A, when coming into contact with a power transmission device (e.g., the power transmission device 530 in FIG. 5), a power reception device (e.g., the power reception device 520 in FIG. 5) may wirelessly receive power from the power transmission device 530. FIGS. 5 and 6A are rear views of the electronic device 300 (i.e., views in the z axis direction).

In an embodiment, the power reception device 520 may include a coil antenna (e.g., the coil antenna 470 in FIG. 4) wound in a circle and a plurality of magnets (e.g., the plurality of magnets 473 in FIG. 4) adjacent to the outermost coil of the coil antenna 470 and disposed to be spaced apart from the outermost coil. For example, the plurality of magnets 473 may be disposed in a form surrounding the outermost coil in a way to be adjacent to the outermost coil of the coil antenna 470.

In various embodiments, the plurality of magnets 473 of the power reception device 520 may be implemented in an open loop form. For example, an opening 605 may be formed by omitting at least one magnet of the plurality of magnets 473. The opening 605 may provide a path (or guide) for an electrical connection between the coil antenna 470 and a wireless communication circuit disposed in a printed circuit board (e.g., the printed circuit board 440 in FIG. 4).

The disclosure is not limited to the embodiment. Although not illustrated, the plurality of magnets 473 may be implemented in a closed loop form in another embodiment.

In an embodiment, each of the plurality of magnets 473 may have a rectangular shape.

With reference to FIG. 6B, slits 635 may be formed between the plurality of magnets 473. As the slits 635 are formed between the plurality of magnets 473, if rotation (e.g., the rotation of the power reception device 520 or the rotation of the power transmission device 530) occurs in the state in which the magnets of the power reception device 520 and the magnets of the power transmission device 530 are attached to each other, the power transmission device 530 can be effectively prevented from being detached from the power reception device 520 and a feeling of dialing can be provided to a user because a steady tensile force is formed. This will be specifically described with reference to FIG. 12 described later.

In FIGS. 6A and 6B according to various embodiments, each of the plurality of magnets 473 has been illustrated as having a rectangular shape, but the disclosure is not limited thereto. For example, as illustrated in FIG. 6C, each of the plurality of magnets 473 may have a trapezoidal shape in another embodiment.

Figure 6D:
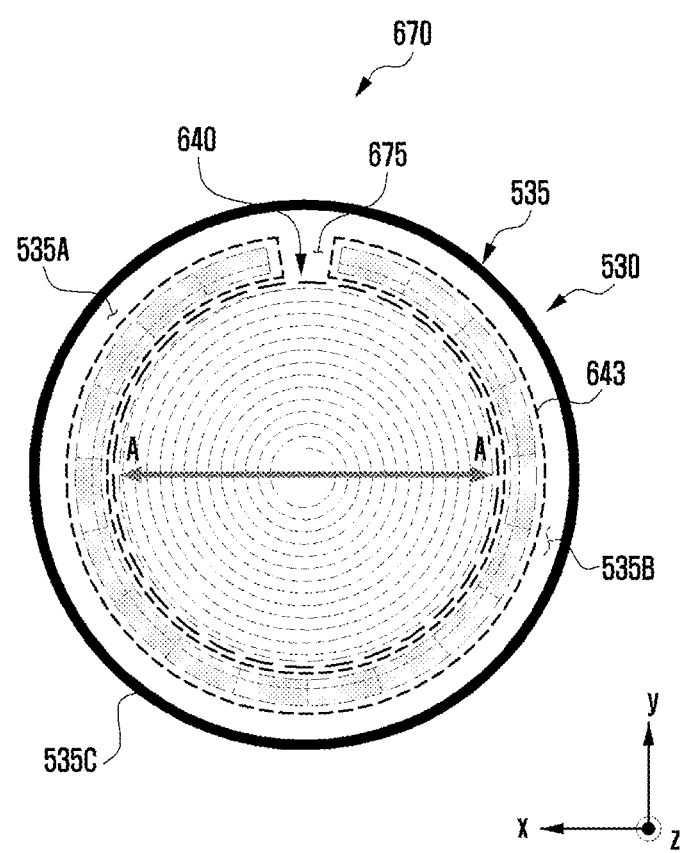
FIG. 6D is a diagram illustrating a coil antenna and a plurality of magnets disposed in an internal space of a power transmission device according to various embodiments.

FIG. 6D is a diagram 670 illustrating a coil antenna 640 and a plurality of magnets 643 disposed in an internal space of a power transmission device 530 according to various embodiments.

With reference to FIG. 6D, a power transmission device (e.g., the power transmission device 530 in FIG. 5) may have a circular housing 535, but the disclosure is not limited thereto. The power transmission device 530 may have a square, rectangular, or oval housing in another embodiment.

In an embodiment, the power transmission device 530 may include the housing 535 including a first surface (or a front surface) 535A, a second surface (or a back surface) 535B, and a side surface 535C surrounding a space between the first surface 535A and the second surface 535B. The power transmission device 530 may include the coil antenna 640 disposed in an internal space of the housing 535 of the power transmission device 530. For example, similar to the coil antenna 470 of the power reception device 520 illustrated in FIG. 6A, the coil antenna 640 of the power transmission device 530 may be wound in a circle and disposed in an internal space of the housing 535 of the power transmission device 530. The power transmission device 530 may include the plurality of magnets 643 adjacent to the outermost coil of the coil antenna 640 and disposed to be spaced apart from the outermost coil. For example, the plurality of magnets 643 may be disposed in a form surrounding the outermost coil in a way to be adjacent to the outermost coil of the coil antenna 640.

In various embodiments, the plurality of magnets 643 of the power transmission device 530 may be implemented in an open loop form. For example, an opening 675 may be formed as at least one magnet between at least some magnets of the plurality of magnets 643 is omitted. For example, if the power transmission device 530 has been implemented to receive external power from a travel adapter (TA) in a wired way and wirelessly supply power to the power reception device 520, the opening 675 may provide a path for disposing various wires for a connection between the coil antenna 640 and the TA. Furthermore, for example, if the power transmission device 530 includes a battery (not illustrated) and has been implemented to wirelessly supply power to the power reception device 520 by using power of the battery, the opening 675 may provide a path (or a guide) for an electrical connection between the coil antenna 640 and a wireless communication circuit.

The disclosure is not limited to the embodiment. Although not illustrated, the plurality of magnets 643 may be implemented in a closed loop form in another embodiment.

In various embodiments, although not illustrated, in the same manner as the plurality of magnets 473 of the power reception device 520 according to FIG. 6B, slits may be formed between the plurality of magnets 643 of the power transmission device 530.

In an embodiment, each of the plurality of magnets 643 may have a rectangular shape, but the disclosure is not limited thereto. Although not illustrated, in the same manner as the plurality of magnets 473 of the power reception device 520 according to FIG. 6C, each of the plurality of magnets 643 of the power transmission device 530 may have a trapezoidal shape in another embodiment.

Figure 7:
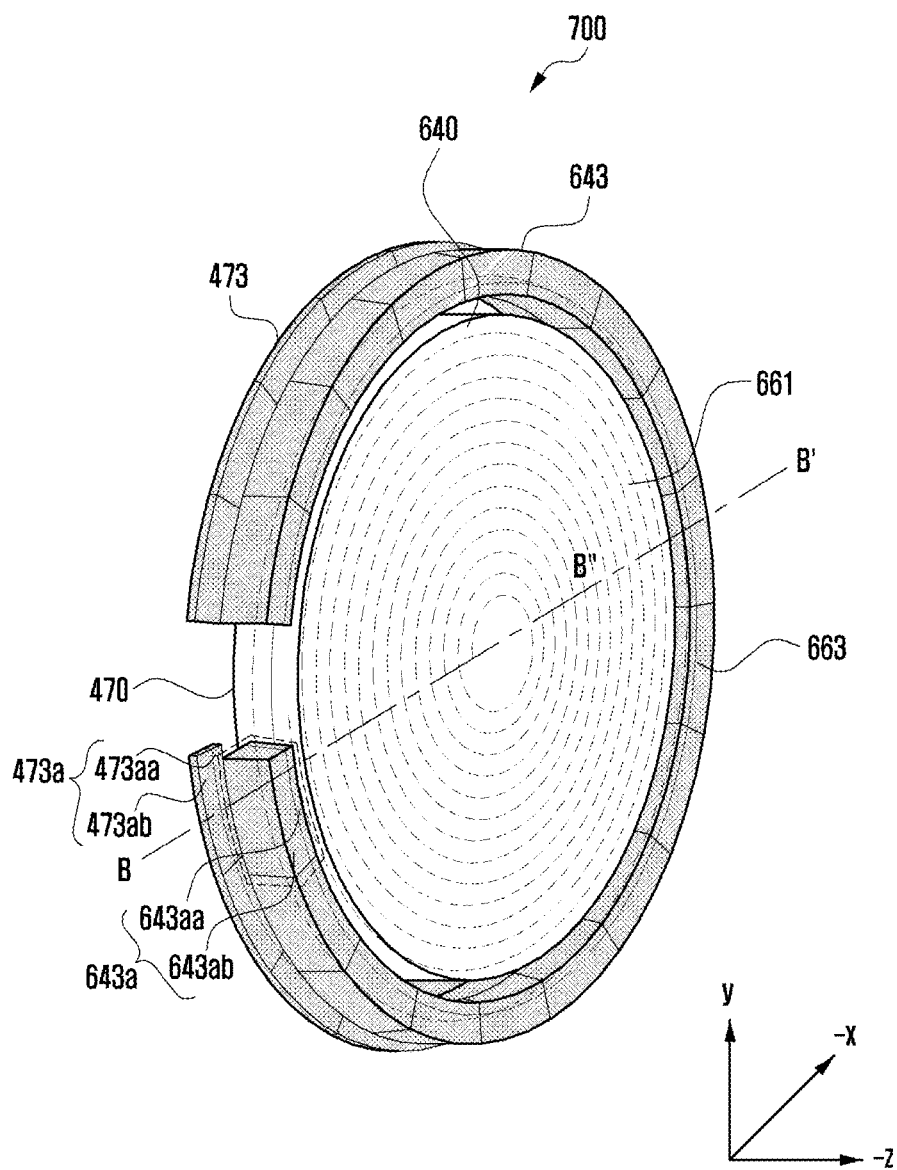
FIG. 7 is a diagram illustrating the state in which the power reception device and the power transmission device have been brought into contact with each other (or attached) according to various embodiments.

FIG. 7 is a diagram 700 illustrating the state in which the power reception device 520 and the power transmission device 530 have been brought into contact with each other (or attached) according to various embodiments.

With reference to FIG. 7, a power reception device (e.g., the power reception device 520 in FIG. 5) may include a coil antenna (e.g., the coil antenna 470 in FIG. 4) wound in a circle and a plurality of magnets (e.g., the plurality of magnets 473 in FIG. 4) disposed in a form surrounding the outermost coil in a way to be adjacent to the outermost coil of the coil antenna 470.

In an embodiment, each of the plurality of magnets 473 of the power reception device 520 may include a first magnet and a second magnet. For example, a magnet 473*a* of the power reception device 520 may include a first magnet 473*aa* and a second magnet 473*ab*. The first magnet 473*aa* may be disposed in a way to be adjacent to the outermost coil of the coil antenna 470. The second magnet 473*ab* may be disposed in a way to be coupled with the first magnet 473*aa* and farther from the outermost coil than the first magnet 473*aa*.

In an embodiment, the first magnet 473*aa* and second magnet 473*ab* of the power reception device 520 may be disposed to form magnetism in different directions from each other.

In an embodiment, a power transmission device (e.g., the power transmission device 530 in FIG. 5) may include a coil antenna (e.g., the coil antenna 640 in FIG. 6D) wound in a circle and a plurality of magnets (e.g., the plurality of magnets 643 in FIG. 6D) disposed in a form surrounding the outermost coil in a way to be adjacent to the outermost coil of the coil antenna 640.

In an embodiment, each of the plurality of magnets 643 of the power transmission device 530 may include a first magnet and a second magnet. For example, a magnet 643*a* of the power transmission device 530 may include the first magnet 643*aa* and the second magnet 643*ab*. The first magnet 643aa may be disposed in a way to be adjacent to the outermost coil of the coil antenna 640. The second magnet 643ab may be disposed in a way to be coupled with the first magnet 643aa and farther from the outermost coil than the first magnet 643aa.

In an embodiment, the first magnet 643aa and second magnet 643ab of the power transmission device 530a may be disposed to form magnetism in different directions from each other.

In an embodiment, when the power reception device 520 is brought into contact with (or is attached to) the power transmission device 530, the power reception device 520 and the power transmission device 530 may have a state in which the power reception device 520 and the power transmission device 530 are disposed in a way to be arranged due to coupling between the plurality of magnets 473 of the power reception device 520 and the plurality of magnets 643 of the power transmission device 530. For example, when the power reception device 520 is brought into contact with (or is attached to) the power transmission device 530, the power reception device 520 and the power transmission device 530 may be constituted to magnetically attract each other due to coupling between the plurality of magnets 473 of the power reception device 520 and the plurality of magnets 643 of the power transmission device 530. Accordingly, the power reception device 520 and the power transmission device 530 may be disposed in a way that the coil antenna 470 of the power reception device 520 and the coil antenna 640 of the power transmission device 530 are arranged in the z axis direction. As the coil antenna 470 of the power reception device 520 and the coil antenna 640 of the power transmission device 530 are disposed in a way to be arranged, charging efficiency can be improved.

Figure 8:
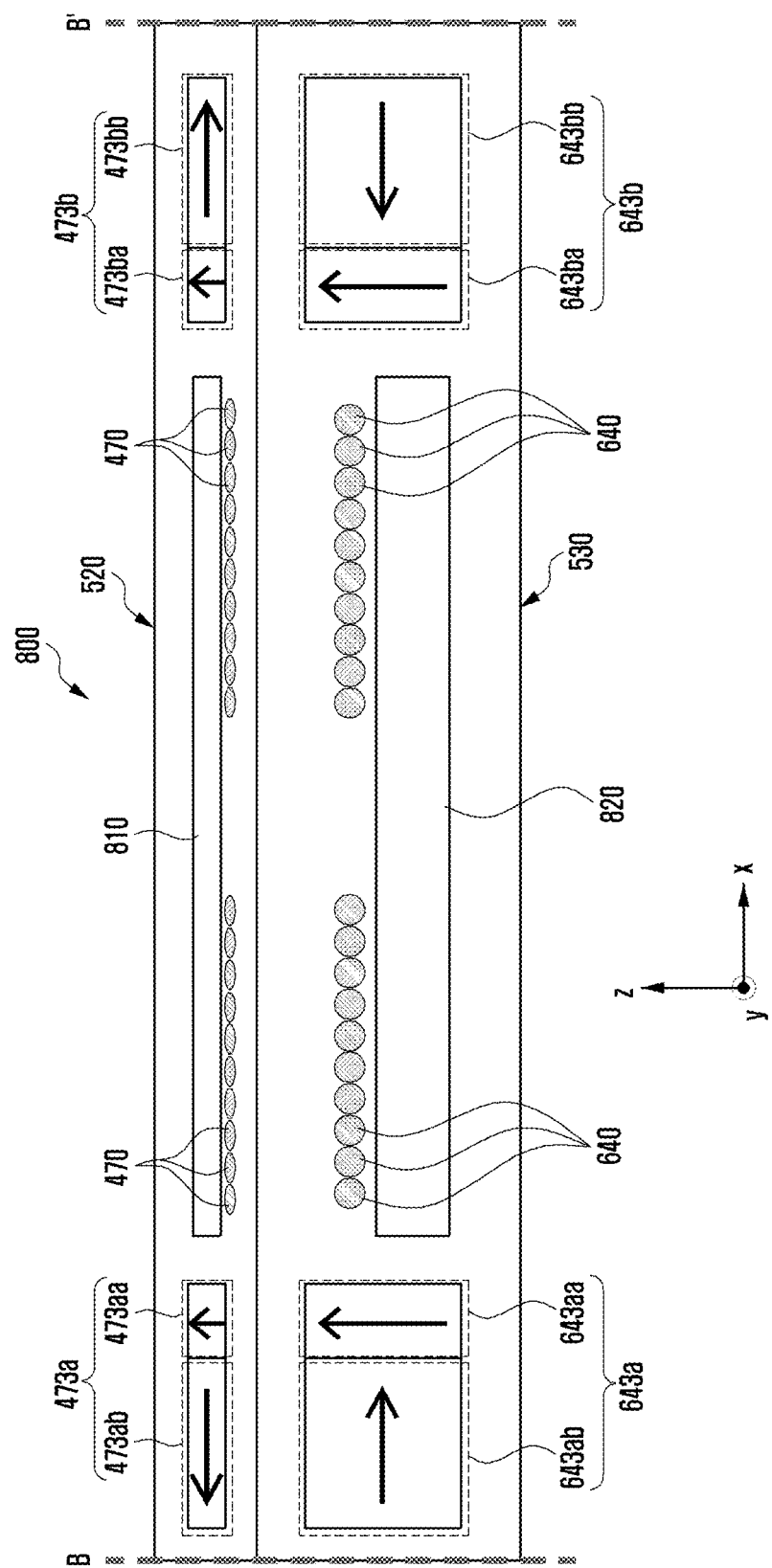
FIG. 8 is a diagram illustrating a cross sectional view taken along line B-B' in FIG. 7 according to various embodiments.

FIG. 8 is a diagram 800 illustrating a cross sectional view taken along line B-B' in FIG. 7 according to various embodiments.

With reference to FIG. 8, when a power reception device (e.g., the power reception device 520 in FIG. 5) is brought into contact with (or is attached to) a power transmission device (e.g., the power transmission device 530 in FIG. 5), a coil antenna (e.g., the coil antenna 470 in FIG. 6A, 6B, or 6C) of the power reception device 520 and a coil antenna (e.g., the coil antenna 640 in FIG. 6D) of the power transmission device 530 may have a state in which the coil antennas have been disposed in a way to be arranged due to coupling between a plurality of magnets (e.g., the plurality of magnets 473 in FIG. 4) of the power reception device 520 and a plurality of magnets (e.g., the plurality of magnets 643 in FIG. 6D) of the power transmission device 530.

In an embodiment, a first shielding sheet 810 may be disposed over (e.g., a z axis direction) the coil antenna 470 of the power reception device 520. For example, the first shielding sheet 810 can improve charging efficiency of the coil antenna 470 of the power reception device 520 by concentrating a signal (e.g., an electromagnetic signal) transmitted by the coil antenna 640 of the power transmission device 530 in a specific direction (e.g., the z axis direction).

In an embodiment, the power reception device 520 may include the plurality of magnets 473 adjacent to the outermost coil of the coil antenna 470 and disposed to be spaced apart from the outermost coil.

FIG. 8 according to various embodiments illustrates a cross sectional view taken along line B-B' in FIG. 7. A first magnet 473a and a second magnet 473b among the plurality of magnets 473 of the power reception device 520 may be disposed in a way to be symmetrical to each other with respect to the coil antenna 470. For example, the first magnet 473a of the power reception device 520 may have a form in which the first magnet 473a is disposed on the left (e.g., a −x axis direction) of the coil antenna 470. The second magnet 473b may have a form in which the second magnet 473b is disposed on the right (e.g., an x axis direction) of the coil antenna 470.

In an embodiment, each of the first magnet 473a and second magnet 473b of the power reception device 520 may include a plurality of magnets.

In an embodiment, the first magnet 473a of the power reception device 520 may include a (1-1)-th magnet 473aa and (1-2)-th magnet 473ab. The (1-1)-th magnet 473aa of the first magnet 473a of the power reception device 520 may be disposed in a way to be adjacent to the outermost coil of the coil antenna 470. The (1-2)-th magnet 473ab of the first magnet 473a of the power reception device 520 may be disposed in a way to be coupled with the (1-1)-th magnet 473aa (e.g., disposed in a way to be coupled with the (1-1)-th magnet 473aa in the −x axis direction).

In the disclosure, the same name may be used to indicate different objects depending on embodiments. For example, in FIG. 7 the name "first magnet" is used to indicate the object 473aa, while in FIG. 8 the name "first magnet" is used to indicate the object 473a and the object 473aa is named as "(1-1)-th magnet".

In an embodiment, the (1-1)-th magnet 473aa and (1-2)-th magnet 473ab of the first magnet 473a of the power reception device 520 may be disposed so that magnetism is formed in different directions. For example, the (1-1)-th magnet 473aa of the first magnet 473a may be disposed so that a portion of magnetism induced by the (1-1)-th magnet 473aa is formed in a first direction (e.g., the z axis direction) perpendicular to the first shielding sheet 810 of the first magnet 473a. The (1-2)-th magnet 473ab of the first magnet 473a may be disposed so that a portion of magnetism induced by the (1-2)-th magnet 473ab is formed in a second direction (e.g., the x axis direction) perpendicular to a first direction (e.g., the z axis direction).

In an embodiment, the second magnet 473b of the power reception device 520 may include a (2-1)-th magnet 473ba and a (2-2)-th magnet 473bb. The (2-1)-th magnet 473ba of the second magnet 473b may be disposed in a way to be adjacent to the outermost coil of the coil antenna 470. The (2-2)-th magnet 473bb of the second magnet 473b may be disposed in a way to be coupled with the (2-1)-th magnet 473ba (e.g., disposed in a way to be coupled with the (2-1)-th magnet 473ba in the x axis direction).

In an embodiment, the (2-1)-th magnet 473ba and (2-2)-th magnet 473bb of the second magnet 473b of the power reception device 520 may be disposed so that magnetism is formed in different directions. For example, the (2-1)-th magnet 473ba of the second magnet 473b may be disposed so that a portion of magnetism induced by the (2-1)-th magnet 473ba is formed in a first direction (e.g., the z axis direction) perpendicular to the shielding sheet 810. The (2-2)-th magnet 473bb of the second magnet 473b may be disposed so that a portion of magnetism induced by the (2-2)-th magnet 473bb is formed in a second direction (e.g., the x axis direction) perpendicular to a first direction (e.g., the z axis direction).

In an embodiment, a second shielding sheet 820 may be disposed under (e.g., a −z axis direction) the coil antenna 640 of the power transmission device 530. For example, the second shielding sheet 820 can improve charging efficiency of the coil antenna 470 of the power reception device 520 by concentrating a signal (e.g., the electromagnetic signal)

transmitted by the coil antenna 640 of the power transmission device 530 in a specific direction (e.g., the z axis direction).

In an embodiment, the power transmission device 530 may include a plurality of magnets 673 adjacent to the outermost coil of the coil antenna 640 and disposed to be spaced apart from the outermost coil. For example, a first magnet 643a and a second magnet 643b among the plurality of magnets 643 of the power transmission device 530 may be disposed in a way to be symmetrical to each other on the basis of the coil antenna 640. For example, the first magnet 643a of the power transmission device 530 may have a form in which the first magnet 643a is disposed on the left (e.g., the −x axis direction) of the coil antenna 640. The second magnet 643b may have a form in which the second magnet 643b is disposed on the right (e.g., the x axis direction) of the coil antenna 640.

In an embodiment, each of the first magnet 643a and second magnet 643b of the power transmission device 530 may include a plurality of magnets.

In an embodiment, the first magnet 643a of the power transmission device 530 may include a (1-1)-th magnet 643aa and a (1-2)-th magnet 643ab. For example, the (1-1)-th magnet 643aa of the first magnet 643a may be disposed in a way to be adjacent to the outermost coil of the coil antenna 640. The (1-2)-th magnet 643ab of the first magnet 643a may be disposed in a way to be coupled with the (1-1)-th magnet 643aa (e.g., disposed in a way to be coupled with the (1-1)-th magnet 643aa in the −x axis direction).

In an embodiment, the (1-1)-th magnet 643aa and (1-2)-th magnet 643ab of the first magnet 643a of the power transmission device 530 may be disposed so that magnetism is formed in different directions. For example, the (1-1)-th magnet 643aa of the first magnet 643a may be disposed so that a portion of magnetism induced by the (1-1)-th magnet 643aa is formed in a first direction (e.g., the z axis direction) perpendicular to the second shielding sheet 820. The (1-2)-th magnet 643ab of the first magnet 643a may be disposed so that a portion of magnetism induced by the (1-2)-th magnet 643ab is formed in a second direction (e.g., the x axis direction) perpendicular to a first direction (e.g., the z axis direction).

In an embodiment, the second magnet 643b of the power transmission device 530 may include a (2-1)-th magnet 643ba and a (2-2)-th magnet 643bb. The (2-1)-th magnet 643ba of the second magnet 643b may be disposed in a way to be adjacent to the outermost coil of the coil antenna 640. The (2-2)-th magnet 643bb of the second magnet 643b may be disposed in a way to be coupled with the (2-1)-th magnet 643ba (e.g., disposed in a way to be coupled with the (2-1)-th magnet 643ba in the x axis direction).

In an embodiment, the (2-1)-th magnet 643ba and (2-2)-th magnet 643bb of the second magnet 643b of the power transmission device 530 may be disposed so that magnetism is formed in different directions. For example, the (2-1)-th magnet 643ba of the second magnet 643b may be disposed so that a portion of magnetism induced by the (2-1)-th magnet 643ba is formed in a first direction (e.g., the z axis direction) perpendicular to the second shielding sheet 820. The (2-2)-th magnet 643bb of the second magnet 643b may be disposed so that a portion of magnetism induced by the (2-2)-th magnet 643bb is formed in a second direction (e.g., the x axis direction) perpendicular to a first direction (e.g., the z axis direction).

In an embodiment, as the power reception device 520 and the power transmission device 530 are brought into contact with each other, magnetism generated by the (1-1)-th magnet 643aa of the power transmission device 530 may be induced in a first direction (e.g., the z axis direction), may be induced in the first direction (e.g., the z axis direction) by the (1-1)-th magnet 473aa of the power reception device 520, may be induced in a third direction (e.g., the −x axis direction) by the (1-2)-th magnet 473ab of the power reception device 520, and may be induced in a second direction (e.g., the x axis direction) by the (1-2)-th magnet 643ab of the power transmission device 530. Furthermore, magnetism generated by the (2-1)-th magnet 643ba of the power transmission device 530 may be induced in the first direction (e.g., the z axis direction), may be induced in the first direction (e.g., the z axis direction) by the (2-1)-th magnet 473ba of the power reception device 520, may be induced in the second direction (e.g., the x axis direction) by the (2-2)-th magnet 473bb of the power reception device 520, and may be induced in the third direction (e.g., the −x axis direction) by the (2-2)-th magnet 643bb of the power transmission device 530.

In various embodiments, as magnetism generated as the power reception device 520 is brought into contact with the power transmission device 530 forms a closed loop, magnetism introduced into the first shielding sheet 810 of the power reception device 520 and the second shielding sheet 820 of the power transmission device 530 may be reduced. Accordingly, charging efficiency can be improved.

Figure 9:
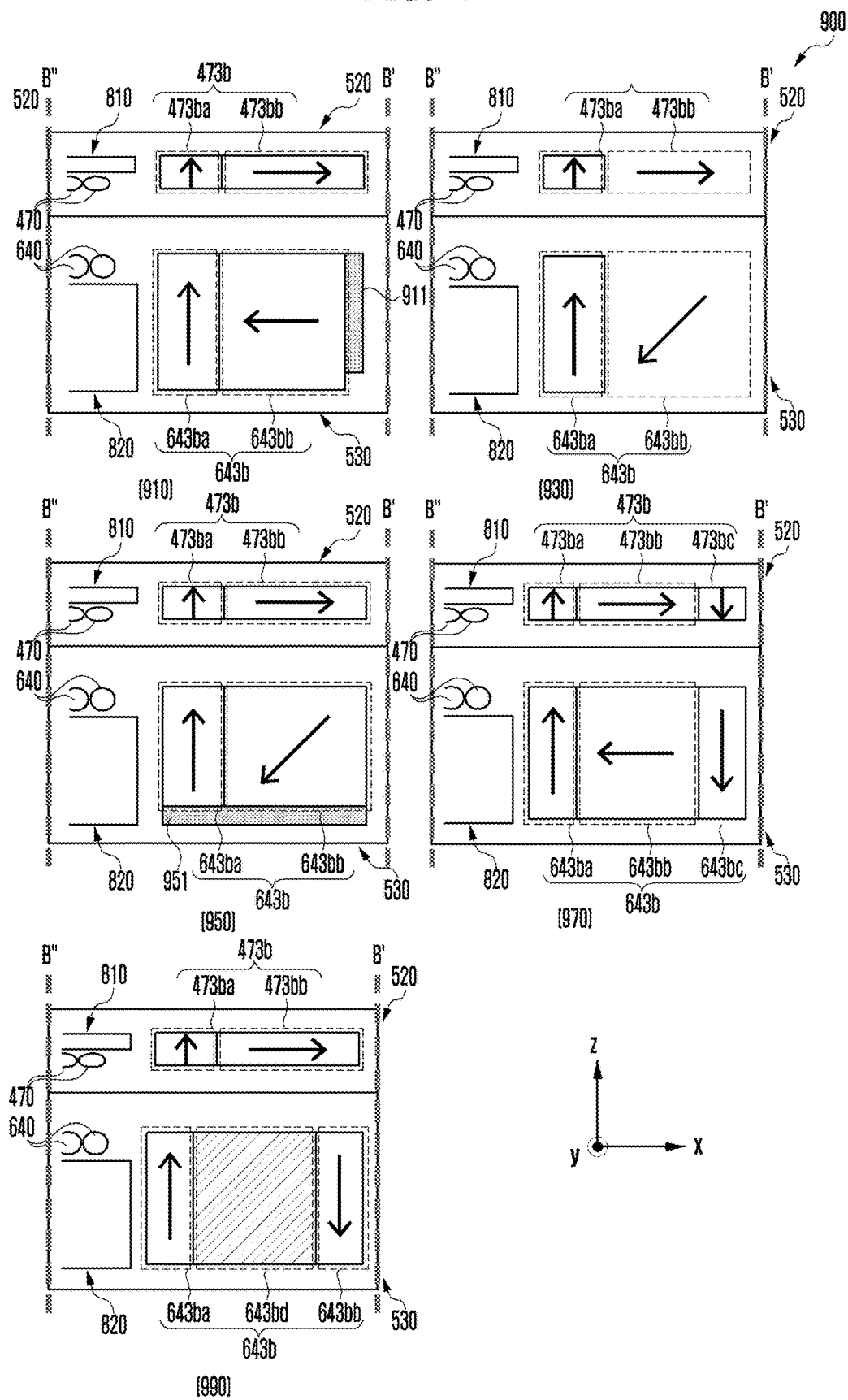
FIG. 9 is a diagram illustrating a cross sectional view taken along line B"-B' in FIG. 7 according to various embodiments.

FIG. 9 is a diagram 900 illustrating a cross sectional view taken along line B"-B' in FIG. 7 according to various embodiments.

With reference to FIG. 9, as illustrated in reference numeral <910>, a power reception device (e.g., the power reception device 520 in FIG. 5) may include a coil antenna (e.g., the coil antenna 470 in FIG. 6A, 6B, or 6C) wound in a circle and the plurality of magnets 473 adjacent to the outermost coil of the coil antenna 470 and disposed to be spaced apart from the outermost coil. The first shielding sheet 810 may be disposed over (e.g., the z axis direction) the coil antenna 470 of the power reception device 520.

In an embodiment, the power reception device 520 may include the second magnet 473b disposed on the right (e.g., the x axis direction) of the coil antenna 470. Although not illustrated, the first magnet 473a may be disposed on the left (e.g., the −x axis direction) of the coil antenna 470. The second magnet 473b of the power reception device 520 may include the (2-1)-th magnet 473ba and the (2-2)-th magnet 473bb. The (2-1)-th magnet 473ba of the second magnet 473b may be disposed in a way to be adjacent to the outermost coil of the coil antenna 470. The (2-2)-th magnet 473bb of the second magnet 473b may be disposed in a way to be coupled with the (2-1)-th magnet 473ba (e.g., disposed in a way to be coupled with the (2-1)-th magnet 473ba in the x axis direction).

In an embodiment, the (2-1)-th magnet 473ba and (2-2)-th magnet 473bb of the second magnet 473b of the power reception device 520 may be disposed so that magnetism is formed in different directions. For example, the (2-1)-th magnet 473ba of the second magnet 473b may be disposed so that a portion of magnetism induced by the (2-1)-th magnet 473ba is formed in a first direction (e.g., the z axis direction) perpendicular to the shielding sheet 810. The (2-2)-th magnet 473bb of the second magnet 473b may be disposed so that a portion of magnetism induced by the (2-2)-th magnet 473bb is formed in a second direction (e.g., the x axis direction) perpendicular to the first direction (e.g., the z axis direction).

In an embodiment, a power transmission device (e.g., the power transmission device 530 in FIG. 5) may include a coil antenna (e.g., the coil antenna 640 in FIG. 6D) wound in a circle and the plurality of magnets 643 adjacent to the outermost coil of the coil antenna 640 and disposed to be spaced apart from the outermost coil. The second shielding sheet 820 may be disposed under (e.g., the −z axis direction) the coil antenna 640 of the power transmission device 530.

In an embodiment, the power transmission device 530 may include the second magnet 643b disposed on the right (e.g., the x axis direction) of the coil antenna 640. Although not illustrated, the first magnet 643a may be disposed on the left (e.g., the −x axis direction) of the coil antenna 640.

In an embodiment, the second magnet 643b of the power transmission device 530 may include the (2-1)-th magnet 643ba and the (2-2)-th magnet 643bb. The (2-1)-th magnet 643ba of the second magnet 643b may be disposed in a way to be adjacent to the outermost coil of the coil antenna 640. The (2-2)-th magnet 643bb of the second magnet 643b may be disposed in a way to be coupled with the (2-1)-th magnet 643ba (e.g., disposed in a way to be coupled with the (2-1)-th magnet 643ba in the x axis direction).

In an embodiment, the (2-1)-th magnet 643ba and (2-2)-th magnet 643bb of the second magnet 643b of the power transmission device 530 may be disposed so that magnetism is formed in different directions. For example, the (2-1)-th magnet 643ba of the second magnet 643b may be disposed so that a portion of magnetism induced by the (2-1)-th magnet 643ba is formed in a first direction (e.g., the z axis direction) perpendicular to the second shielding sheet 820. The (2-2)-th magnet 643bb of the second magnet 643b may be disposed so that a portion of magnetism induced by the (2-2)-th magnet 643bb is formed in a second direction (e.g., the x axis direction) perpendicular to the first direction (e.g., the z axis direction).

In an embodiment, the power transmission device 530 may include a shielding material 911 (e.g., or a steel plate for shielding or a magnetic substance for shielding) disposed on one surface of the (2-2)-th magnet 643bb of the second magnet 643b and for guiding magnetism. The shielding material 911 may be formed of a steel plate.

In an embodiment, as the power reception device 520 and the power transmission device 530 are brought into contact with each other, magnetism generated by the (2-1)-th magnet 643ba of the power transmission device 530 may be induced in a first direction (e.g., the z axis direction), may be induced in the first direction (e.g., the z axis direction) by the (2-1)-th magnet 473ba of the power reception device 520, may be induced in a second (e.g., the x axis direction) by the (2-2)-th magnet 473bb of the power reception device 520, and may be induced in a third direction (e.g., the −x axis direction) by the (2-2)-th magnet 643bb of the power transmission device 530. As the shielding material 911 for guiding magnetism is disposed on one surface of the (2-2)-th magnet 643bb of the second magnet 643b, magnetism induced in a second direction (e.g., the −x axis direction) by the (2-2)-th magnet 643bb of the power transmission device 530 can be prevented from being induced to an outside direction (e.g., the x axis direction) of the (2-2)-th magnet 643bb.

In describing the constituent elements of the power reception device 520 and the power transmission device 530 illustrated in reference numerals <930>, <950>, <970>, and <990> described later according to various embodiments, constituent elements of the power reception device 520 and the power transmission device 530 which are substantially the same as those of reference numeral <910> are assigned the same reference numerals, and a detailed description thereof may be omitted.

Compared to reference numeral <910>, in reference numeral <930> according to various embodiments, the (2-2)-th magnet 643bb of the second magnet 643b included in the power transmission device 530 may be disposed so that a portion of magnetism induced by the (2-2)-th magnet 643bb is formed in a fourth direction (e.g., a direction between the −x axis and the −z axis), that is, a direction diagonal to a first direction (e.g., the z axis direction).

In an embodiment, as the power reception device 520 and the power transmission device 530 are brought into contact with each other, magnetism generated by the (2-1)-th magnet 643ba of the power transmission device 530 may be induced in a first direction (e.g., the z axis direction), may be induced in the first direction (e.g., the z axis direction) by the (2-1)-th magnet 473ba of the power reception device 520, may be induced in a second direction (e.g., the x axis direction) by the (2-2)-th magnet 473bb of the power reception device 520, and may be induced in the fourth direction (e.g., the direction between the −x axis and the −z axis) by the (2-2)-th magnet 643bb of the power transmission device 530.

In various embodiments, compared to reference numeral <930>, reference numeral <950> may include a shielding material 951 disposed under (e.g., the −z axis direction) the second magnet 643b of the power transmission device 530 and for guiding magnetism.

In an embodiment, as the shielding material 951 for guiding magnetism is disposed under (e.g., the −z axis direction) the second magnet 643b, magnetism induced in a fourth direction (e.g., the direction between the −x axis and the −z axis) by the (2-2)-th magnet 643bb of the power transmission device 530 can be prevented from being induced in an outside direction (e.g., the −z axis direction) of the (2-2)-th magnet 643bb. Here, the outside direction may mean a direction from the inside of the power transmission device 530/power reception device 520 to the outside thereof (e.g., the −z axis direction, or x axis direction).

In FIG. 8 and reference numerals <910>, <930>, and <950> of FIG. 9 according to various embodiments, it has been described that each of the first magnet 473a, 643a and second magnet 473b, 643b of the power reception device 520 and the power transmission device 530 includes the two magnets 473aa and 473ab, 643aa and 643ab, 473ba and 473bb, 643ba and 643bb, but the disclosure is not limited thereto.

For example, as illustrated in reference numeral <970>, each of the first magnet 473a, 643a and second magnet 473b, 643b of the power reception device 520 and the power transmission device 530 may include more than two magnets. For example, the second magnet 473b of the power reception device 520 may include a (2-1)-th magnet 473ba, a (2-2)-th magnet 473bb, and a (2-3)-th magnet 473bc. The (2-1)-th magnet 473ba of the second magnet 473b may be disposed in a way to be adjacent to the outermost coil of the coil antenna 470. The (2-2)-th magnet 473bb of the second magnet 473b may be disposed in a way to be coupled with the (2-1)-th magnet 473ba (e.g., disposed in a way to be coupled with the (2-1)-th magnet 473ba in the x axis direction). The (2-3)-th magnet 473bc of the second magnet 473b may be disposed in a way to be coupled with the (2-2)-th magnet 473bb (e.g., disposed in a way to be coupled with the (2-2)-th magnet 473bb in the x axis direction). In an embodiment, the (2-3)-th magnet 473*bc* may be disposed opposing the (2-1)-th magnet 473*ba* with respect to the (2-2)-th magnet 473*bb*.

In an embodiment, the (2-1)-th magnet 473*ba*, (2-2)-th magnet 473*bb*, and (2-3)-th magnet 473*bc* of the second magnet 473*b* included in the power reception device 520 may be disposed so that magnetism is formed in different directions. For example, the (2-1)-th magnet 473*ba* of the second magnet 473*b* may be disposed so that the portion of magnetism induced by the (2-1)-th magnet 473*ba* is formed in a first direction (e.g., the z axis direction) perpendicular to the shielding sheet 810. The (2-2)-th magnet 473*bb* of the second magnet 473*b* may be disposed so that the portion of magnetism induced by the (2-2)-th magnet 473*bb* is formed in a second direction (e.g., the x axis direction) perpendicular to a first direction (e.g., the z axis direction). The (2-3)-th magnet 473*bc* of the second magnet 473*b* may be disposed so that a portion of magnetism induced by the (2-3)-th magnet 473*bc* is formed in a fourth direction (e.g., the −z axis direction), that is, a direction opposite to a first direction (e.g., the z axis direction).

In an embodiment, the second magnet 643*b* included in the power transmission device 530 may include a (2-1)-th magnet 643*ba*, a (2-2)-th magnet 643*bb*, and a (2-3)-th magnet 643*bc*. The (2-1)-th magnet 643*ba* of the second magnet 643*b* may be disposed in a way to be adjacent to the outermost coil of the coil antenna 640. The (2-2)-th magnet 643*bb* of the second magnet 643*b* may be disposed in a way to be coupled with the (2-1)-th magnet 643*ba* (e.g., disposed in a way to be coupled with the (2-1)-th magnet 643*ba* in the x axis direction). The (2-3)-th magnet 643*bc* of the second magnet 643*b* may be disposed in a way to be coupled with the (2-2)-th magnet 643*bb* (e.g., disposed in a way to be coupled with the (2-2)-th magnet 643*bb* in the x axis direction).

In an embodiment, the (2-1)-th magnet 643*ba*, (2-2)-th magnet 643*bb*, and (2-3)-th magnet 643*bc* of the second magnet 643*b* included in the power transmission device 530 may be disposed so that magnetism is formed in different directions. For example, the (2-1)-th magnet 643*ba* of the second magnet 643*b* may be disposed so that a portion of magnetism induced by the (2-1)-th magnet 643*ba* is formed in a first direction (e.g., the z axis direction) perpendicular to the second shielding sheet 820. The (2-2)-th magnet 643*bb* of the second magnet 643*b* may be disposed so that a portion of magnetism induced by the (2-2)-th magnet 643*bb* is formed in a second direction (e.g., the x axis direction) perpendicular to a first direction (e.g., the z axis direction). The (2-3)-th magnet 643*bc* of the second magnet 643*b* may be disposed so that a portion of magnetism induced by the (2-3)-th magnet 643*bc* is formed in a fourth direction (e.g., the −z axis direction), that is, a direction opposite to a first direction (e.g., the z axis direction).

In an embodiment, as the power reception device 520 and the power transmission device 530 are brought into contact with each other, magnetism generated by the (2-1)-th magnet 643*ba* of the power transmission device 530 may be induced in a first direction (e.g., the z axis direction), may be induced in a first direction (e.g., the z axis direction) by the (2-1)-th magnet 473*ba* of the power reception device 520, may be induced in a second direction (e.g., the x axis direction) by the (2-2)-th magnet 473*bb* of the power reception device 520, may be induced in a fourth direction (e.g., the −z axis direction) by the (2-3)-th magnet 473*bc* of the power reception device 520, may be induced in a fourth direction (e.g., the −z axis direction) by the (2-3)-th magnet 643*bc* of the power transmission device 530, and may be induced in a third direction (e.g., the −x axis direction) by the (2-2)-th magnet 643*bb* of the power transmission device 530.

In various embodiments, compared to reference numeral <950>, in reference numeral <990>, the second magnet 643*b* of the power transmission device 530 may include a zone 643*bd* (e.g., a non-magnetized zone) in which a magnet is not disposed between the (2-1)-th magnet 643*ba* and the (2-2)-th magnet 643*bb*. For example, the power transmission device 530 may include the zone 643*bd* (e.g., a non-magnetized zone) in which a magnet is not disposed between the (2-1)-th magnet 643*ba* and the (2-2)-th magnet 643*bb* so that the amount of magnetic field interference of the shielding sheet 810 of the power reception device 520 is effectively reduced. For example, as the width of the zone 643*bd* in which a magnet is not disposed between the (2-1)-th magnet 643*ba* and the (2-2)-th magnet 643*bb* becomes larger in an x axis direction, the amount of magnetic field interference of the shielding sheet 810 of the power reception device 520 may also become smaller. This will be specifically described with reference to FIG. 13B described later.

In an embodiment, as the power reception device 520 and the power transmission device 530 are brought into contact with each other, magnetism generated by the (2-1)-th magnet 643*ba* of the power transmission device 530 may be induced in a first direction (e.g., the z axis direction), may be induced in a first direction (e.g., the z axis direction) by the (2-1)-th magnet 473*ba* of the power reception device 520, may be induced in a third direction (e.g., the x axis direction) by the (2-2)-th magnet 473*bb* of the power reception device 520, and may be induced in a fourth direction (e.g., the −z axis direction) by the (2-2)-th magnet 643*b* of the power transmission device 530.

In FIG. 9 according to various embodiments, it has been described that the shielding material 911, 951 for guiding magnetism is disposed on one surface of the second magnet 643*b* of the power transmission device 530, but the disclosure is not limited thereto. For example, at least one shielding material may be disposed on one surface of the second magnet 473*b* (and/or the first magnet 473*a*) of the power reception device 520 in another embodiment.

In various embodiments, although not illustrated, the second magnet 473*b* of the power reception device 520 may include a zone (e.g., the non-magnetized zone) in which a magnet is not disposed between the (2-1)-th magnet 473*ba* and the (2-2)-th magnet 473*bb*.

As described with reference-to-reference numerals <910>, <930>, <950>, <970>, and <990> of FIG. 9 according to various embodiments, magnetism generated as the power reception device 520 is brought into contact with the power transmission device 530 forms a closed loop. Accordingly, charging efficiency can be improved because magnetism introduced into the first shielding sheet 810 of the power reception device 520 and the second shielding sheet 820 of the power transmission device 530 becomes smaller.

Figure 10:
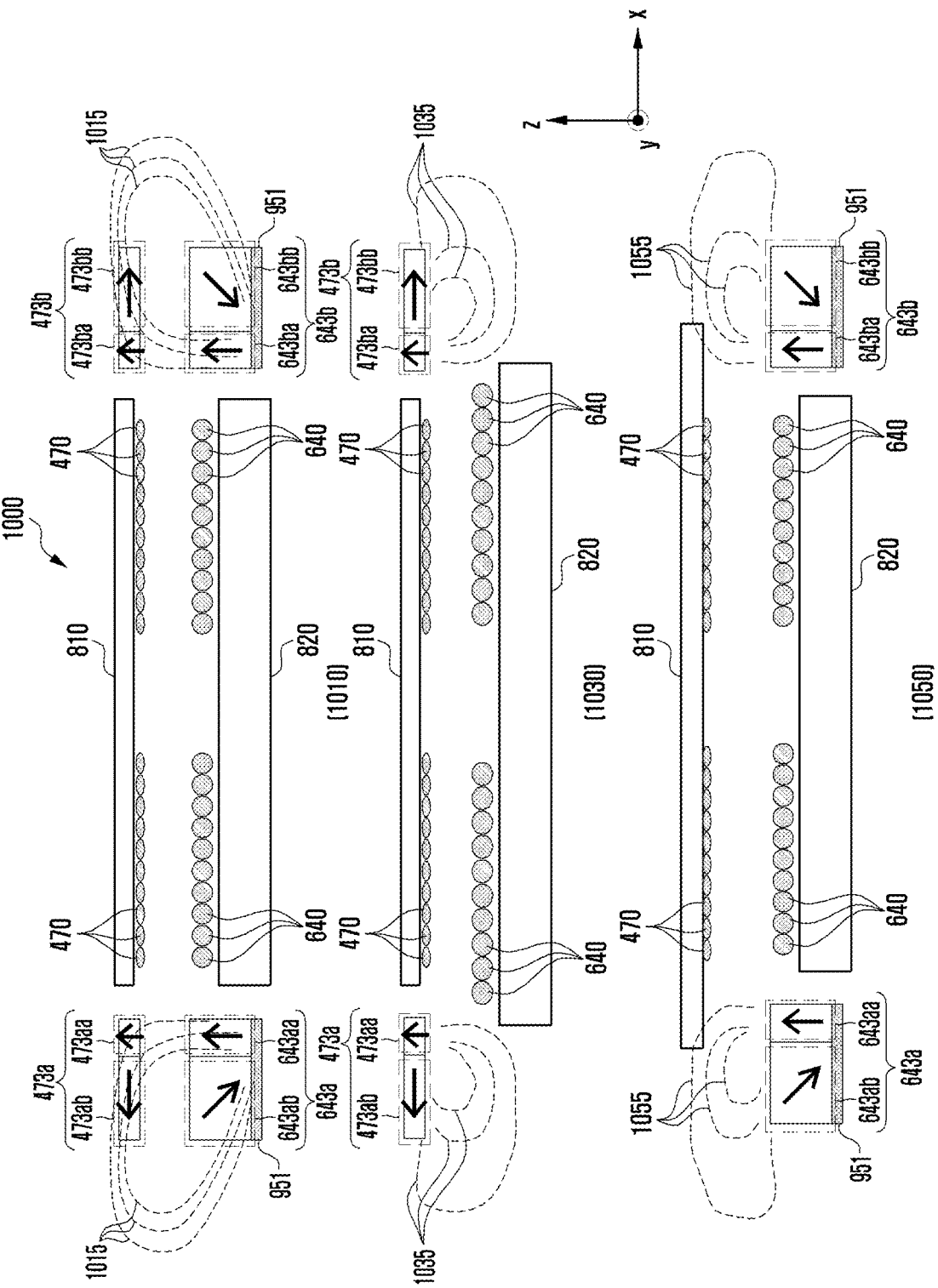
FIG. 10 is a diagram illustrating magnetism directions of magnets included in the power reception device and the power transmission device according to various embodiments.

FIG. 10 is a diagram 1000 illustrating magnetism directions of magnets included in the power reception device 520 and the power transmission device 530 according to various embodiments.

FIG. 10 according to various embodiments is a diagram illustrating a cross sectional view taken along line B-B' in FIG. 7.

Reference numeral <1010> of FIG. 10 according to various embodiments is a diagram illustrating directions of magnetism when a power reception device (e.g., the power reception device 520 in FIG. 5) including a coil antenna (e.g., the coil antenna 470 in FIG. 4) and a plurality of magnets (e.g., the plurality of magnets 473 in FIG. 4) and a power transmission device (e.g., the power transmission device 530 in FIG. 5) including a coil antenna (e.g., the coil antenna 640 in FIG. 6D) and the plurality of magnets 643 are brought into contact with each other (or are attached).

In an embodiment, the power reception device 520 may include the coil antenna 470 wound in a circle and the plurality of magnets 473 adjacent to the outermost coil of the coil antenna 470 and disposed to be spaced apart from the outermost coil. A first shielding sheet 810 may be disposed over (e.g., a z axis direction) the coil antenna 470 of the power reception device 520.

In an embodiment, the power reception device 520 may include the first magnet 473a disposed on the left (e.g., a −x axis direction) of the coil antenna 470 and a second magnet 473b disposed on the right (e.g., an x axis direction) of the coil antenna 470.

In an embodiment, the first magnet 473a of the power reception device 520 may include the (1-1)-th magnet 473aa and the second magnet 473ab. The (1-1)-th magnet 473aa of the first magnet 473a may be disposed so that a portion of magnetism induced by the (1-1)-th magnet 473aa is formed in a first direction (e.g., the z axis direction) perpendicular to a first shielding sheet 810 in a way to be adjacent to the outermost coil of the coil antenna 470. The (1-2)-th magnet 473ab of the first magnet 473a may be disposed in a way to be coupled with the (1-1)-th magnet 473aa (e.g., disposed in a way to be coupled with the (1-1)-th magnet 473aa in the −x axis direction) and may be disposed so that a portion of magnetism induced by the (1-2)-th magnet 473ab is formed in a second direction (e.g., the −x axis direction) perpendicular to the first direction (e.g., the z axis direction).

In an embodiment, the second magnet 473b of the power reception device 520 may include a (2-1)-th magnet 473ba and a (2-2)-th magnet 473bb. The (2-1)-th magnet 473ba of the second magnet 473b may be disposed to be adjacent to the outermost coil of the coil antenna 470, and may be disposed so that a portion of magnetism induced by the (2-1)-th magnet 473ba is formed in a first direction (e.g., the z axis direction) perpendicular to the shielding sheet 810. The (2-2)-th magnet 473bb of the second magnet 473b may be disposed in a way to be coupled with the (2-1)-th magnet 473ba (e.g., disposed in a way to be coupled with the (2-1)-th magnet 473ba in the x axis direction), and may be disposed so that a portion of magnetism induced by the (2-2)-th magnet 473bb is formed in a third direction (e.g., the x axis direction) perpendicular to the first direction (e.g., the z axis direction).

In an embodiment, the power transmission device 530 may include the coil antenna 640 wound in a circle and the plurality of magnets 643 adjacent to the outermost coil of the coil antenna 640 and disposed to be spaced apart from the outermost coil. A second shielding sheet 820 may be disposed under (e.g., a −z axis direction) the coil antenna 640 of the power transmission device 530.

In an embodiment, the power transmission device 530 may include the first magnet 643a disposed on the left (e.g., the −x axis direction) of the coil antenna 640 and a second magnet 643b disposed on the right (e.g., the x axis direction) of the coil antenna 640.

In an embodiment, the first magnet 643a of the power transmission device 530 may include the (1-1)-th magnet 643aa and the (1-2)-th magnet 643ab. For example, the (1-1)-th magnet 643aa of the first magnet 643a may be disposed in a way to be adjacent to the outermost coil of the coil antenna 640, and may be disposed so that a portion of magnetism induced by the (1-1)-th magnet 643aa is formed in a first direction (e.g., the z axis direction) perpendicular to the shielding sheet 820. The (1-2)-th magnet 643ab of the first magnet 643a may be disposed in a way to be coupled with the (1-1)-th magnet 643aa (e.g., disposed in a way to be coupled with the (1-1)-th magnet 643aa in the −x axis direction), and may be disposed so that a portion of magnetism induced by the (1-2)-th magnet 643ab is formed in a fourth direction (e.g., a direction between the x axis and the −z axis), that is, a direction diagonal to the first direction (e.g., the z axis direction).

In an embodiment, the second magnet 643b of the power transmission device 530 may include a (2-1)-th magnet 643ba and a (2-2)-th magnet 643bb. The (2-1)-th magnet 643ba of the second magnet 643b may be disposed in a way to be adjacent to the outermost coil of the coil antenna 640, and may be disposed so that a portion of magnetism induced by the (2-1)-th magnet 643ba is formed in a first direction (e.g., the z axis direction) perpendicular to the second shielding sheet 820. The (2-2)-th magnet 643bb of the second magnet 643b may be disposed in a way to be coupled with the (2-1)-th magnet 643ba (e.g., disposed in a way to be coupled with the (2-1)-th magnet 643ba in the x axis direction), and may be disposed so that a portion of magnetism induced by the (2-2)-th magnet 643bb is formed in a fifth direction (e.g., a direction between the −x axis and the −z axis), that is, a direction diagonal to the first direction (e.g., the z axis direction). In an embodiment, a shielding material 951 disposed under (e.g., the −z axis direction) the second magnet 643b of the power transmission device 530 and for guiding magnetism may be included.

In an embodiment, as the power reception device 520 and the power transmission device 530 are brought into contact with each other, magnetism generated by the (1-1)-th magnet 643aa of the power transmission device 530 may be induced in a first direction (e.g., the z axis direction), may be induced in the first direction (e.g., the z axis direction) by the (1-1)-th magnet 473aa of the power reception device 520, may be induced in a second direction (e.g., the −x axis direction) by the (1-2)-th magnet 473ab of the power reception device 520, and may be induced (1015) in a fourth direction (e.g., a direction between the x axis and the −z axis) by the (1-2)-th magnet 643ab of the power transmission device 530.

In an embodiment, as the power reception device 520 and the power transmission device 530 are brought into contact with each other, magnetism generated by the (2-1)-th magnet 643ba of the power transmission device 530 may be induced in a first direction (e.g., the z axis direction), may be induced in the first direction (e.g., the z axis direction) by the (2-1)-th magnet 473ba of the power reception device 520, may be induced in a third direction (e.g., the x axis direction) by the (2-2)-th magnet 473bb of the power reception device 520, and may be induced (1015) in a fifth direction (e.g., a direction between the −x axis and the −z axis) by the (2-2)-th magnet 643bb of the power transmission device 530.

In describing the constituent elements of the power reception device 520 and the power transmission device 530 illustrated in reference numerals <1030> and <1050> described later according to various embodiments, constituent elements of the power reception device 520 and the power transmission device 530 which are substantially the same as those of reference numeral <1010> are assigned the same reference numerals, and a detailed description thereof may be omitted.

Reference numeral <1030> of FIG. 10 according to various embodiments is a diagram illustrating directions of magnetism when the power reception device 520 including the coil antenna 470 and the plurality of magnets 473 and the power transmission device 530 not including the coil antenna 640 and the plurality of magnets 643 are brought into contact with each other.

In an embodiment, as the power reception device 520 and the power transmission device 530 are brought into contact with each other, magnetism generated by the (1-1)-th magnet 473aa of the power reception device 520 may be induced in a first direction (e.g., the z axis direction), and magnetism generated by the (1-2)-th magnet 473ab of the power reception device 520 may be induced (1035) in a second direction (e.g., the −x axis direction). Magnetism by the (2-1)-th magnet 473ba of the power reception device 520 may be induced in the first direction (e.g., the z axis direction), and magnetism generated by the (2-2)-th magnet 473bb of the power reception device 520 may be induced (1035) in a third direction (e.g., the x axis direction).

Reference numeral <1050> of FIG. 10 according to various embodiments is a diagram illustrating directions of magnetism when the power reception device 520, not including the coil antenna 470 and the plurality of magnets 473, and the power transmission device 530 including the coil antenna 640 and the plurality of magnets 643 are brought into contact with each other.

In an embodiment, as the power reception device 520 and the power transmission device 530 are brought into contact with each other, magnetism generated by the (1-1)-th magnet 643aa of the power transmission device 530 may be induced in a first direction (e.g., the z axis direction), and may be induced (1055) in a fourth direction (e.g., a direction between the x axis and the −z axis) by the (1-2)-th magnet 643ab of the power transmission device 530. Magnetism generated by the (2-1)-th magnet 643ba of the power transmission device 530 may be induced in the first direction (e.g., the z axis direction), and may be induced (1055) in a fifth direction (e.g., the direction between the x axis and the −z axis) by the (2-2)-th magnet 643bb of the power transmission device 530.

Figure 11:
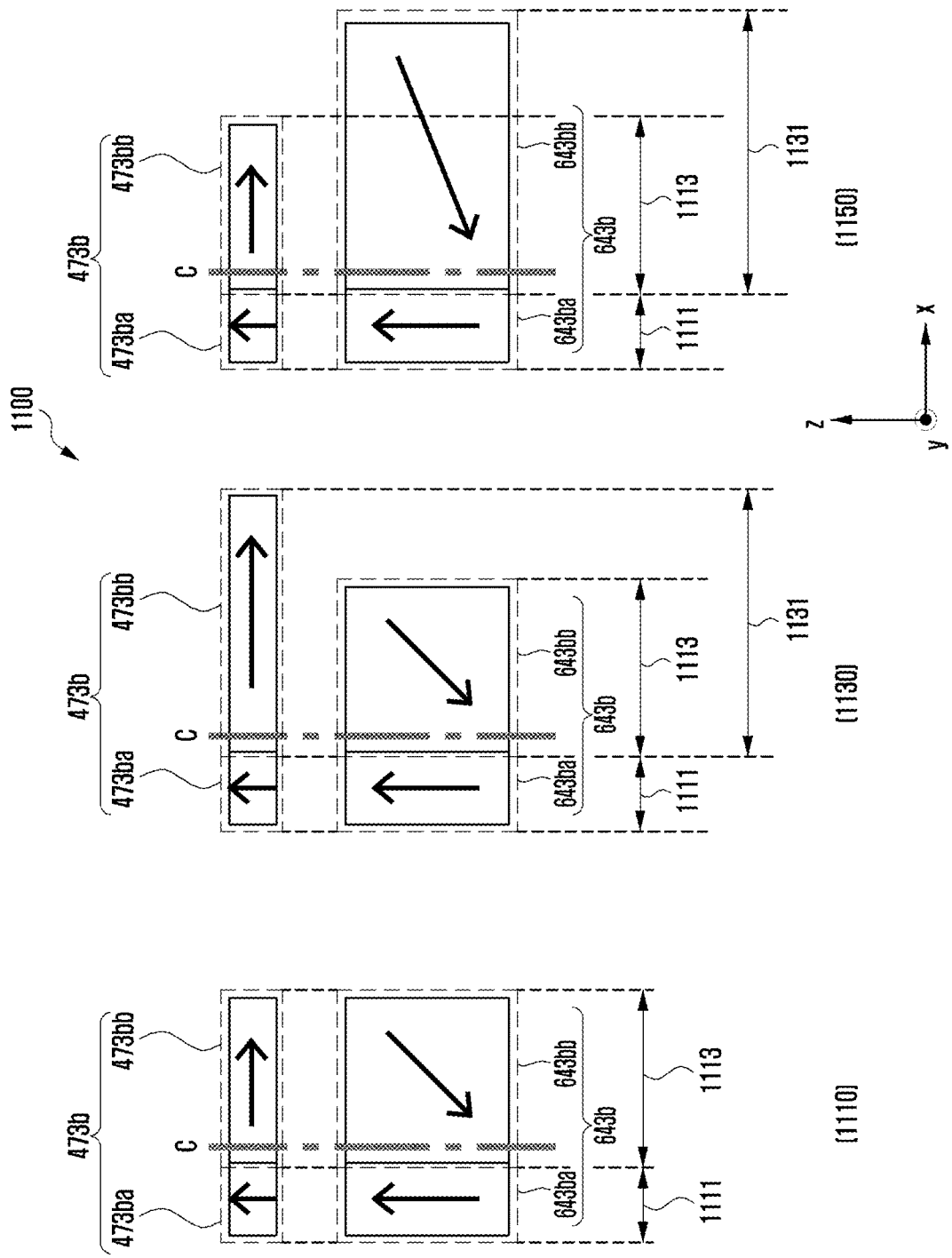
FIG. 11 is a diagram for describing a method of increasing a tensile force between a plurality of magnets of the power reception device and a plurality of magnets included in the power transmission device according to various embodiments.

FIG. 11 is a diagram 1100 for describing a method of increasing a tensile force between the plurality of magnets 473 of the power reception device 520 and the plurality of magnets 643 included in the power transmission device 530 according to various embodiments.

With reference to FIG. 11, a second magnet (e.g., the second magnet 473b in FIG. 8) disposed in a way to be adjacent to a coil antenna (e.g., the coil antenna 470 in FIG. 4) of a power reception device (e.g., the power reception device 520 in FIG. 5) may include a (2-1)-th magnet 473ba and a (2-2)-th magnet 473bb. The (2-1)-th magnet 473ba of the second magnet 473b may be disposed in a way to be adjacent to the outermost coil of the coil antenna 470. The (2-2)-th magnet 473bb of the second magnet 473b may be disposed in a way to be coupled with the (2-1)-th magnet 473ba (e.g., disposed in a way to be coupled with the (2-1)-th magnet 473ba in an x axis direction).

In an embodiment, a second magnet (e.g., the second magnet 643b in FIG. 8) disposed in a way to be adjacent to a coil antenna (e.g., the coil antenna 640 in FIG. 6D) of a power transmission device (e.g., the power transmission device 530 in FIG. 5) may include a (2-1)-th magnet 643ba and a (2-2)-th magnet 643bb. The (2-1)-th magnet 643ba of the second magnet 643b may be disposed in a way to be adjacent to the outermost coil of the coil antenna 640. The (2-2)-th magnet 643bb of the second magnet 643b may be disposed in a way to be coupled with the (2-1)-th magnet 643ba (e.g., disposed in a way to be coupled with the (2-1)-th magnet 643ba in the x axis direction).

In an embodiment, the width of the (2-1)-th magnet 473ba of the power reception device 520 and the width of the (2-1)-th magnet 643ba of the power transmission device 530 may each be a first length 1111 in an x axis direction.

In an embodiment, the width of the (2-2)-th magnet 473bb disposed in a way to be coupled with the (2-1)-th magnet 473ba of the power reception device 520 and the width of the (2-2)-th magnet 643bb disposed in a way to be coupled with the (2-1)-th magnet 643ba of the power transmission device 530 may each be a second length 1113 in the x axis direction longer than the first length 1111 as illustrated in reference numeral <1110>.

In another embodiment, as illustrated in reference numeral <1130> or <1150>, the width of the (2-2)-th magnet 473bb disposed in a way to be coupled with the (2-1)-th magnet 473ba of the power reception device 520 or the width of the (2-2)-th magnet 643bb disposed in a way to be coupled with the (2-1)-th magnet 643ba of the power transmission device 530 may be a third length 1131 in the x axis direction longer than the second length 1113.

In various embodiments, as the width of the (2-1)-th magnet 473ba of the power reception device 520 and the width of the (2-1)-th magnet 643ba of the power transmission device 530 are the same as the first length 1111, the power reception device 520 and the power transmission device 530 may be disposed in a way to be aligned with each other (e.g., the power reception device 520 and the power transmission device 530 are disposed in a way to be automatically aligned with each other at the center thereof by an axis C) because the axis C (e.g., a neutral-zone) is constantly maintained. The width of the (2-1)-th magnet 473ba and the width of the (2-1)-th magnet 643ba of the power transmission device 530 may be made to be the same as the first length 1111, and the width of the (2-2)-th magnet 473bb disposed in a way to be coupled with the (2-1)-th magnet 473ba of the power reception device 520 or the width of the (2-2)-th magnet 643bb disposed in a way to be coupled with the (2-1)-th magnet 643ba of the power transmission device 530 may be made to have the third length 1131 greater than each of the first length 1111 and the second length 1113. Accordingly, a tensile force between the power transmission device 530 and the power reception device 520 may be increased.

Figure 12:
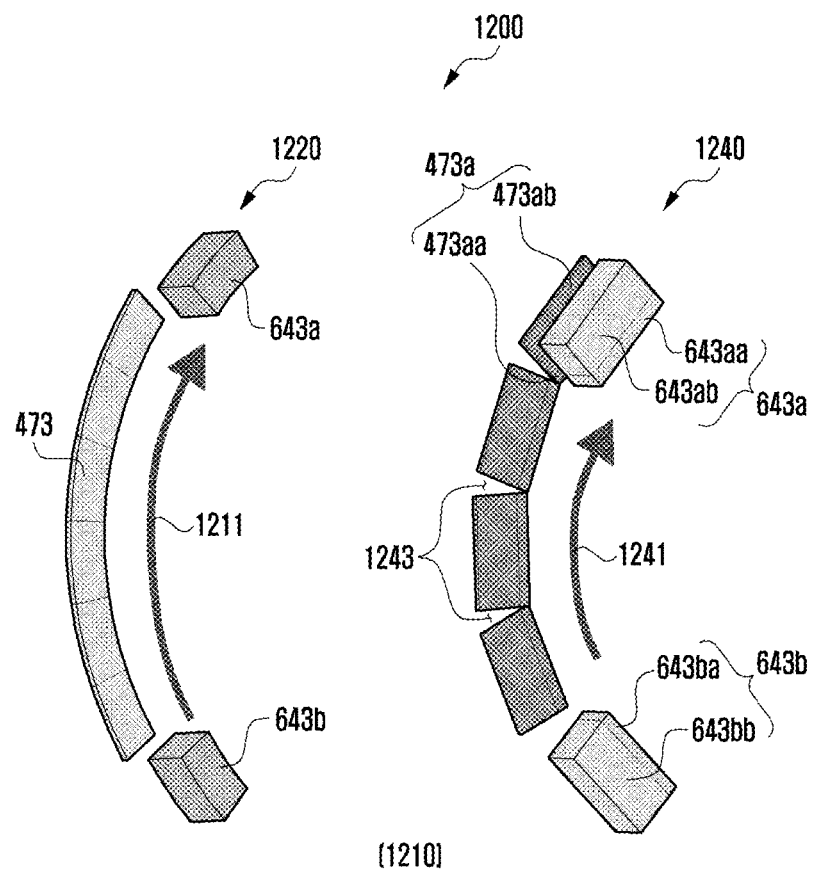
FIG. 12 is a diagram in which tensile forces according to an arrangement structure of a plurality of magnets included in the power reception device and the power transmission device are compared according to various embodiments.
Figure 12:
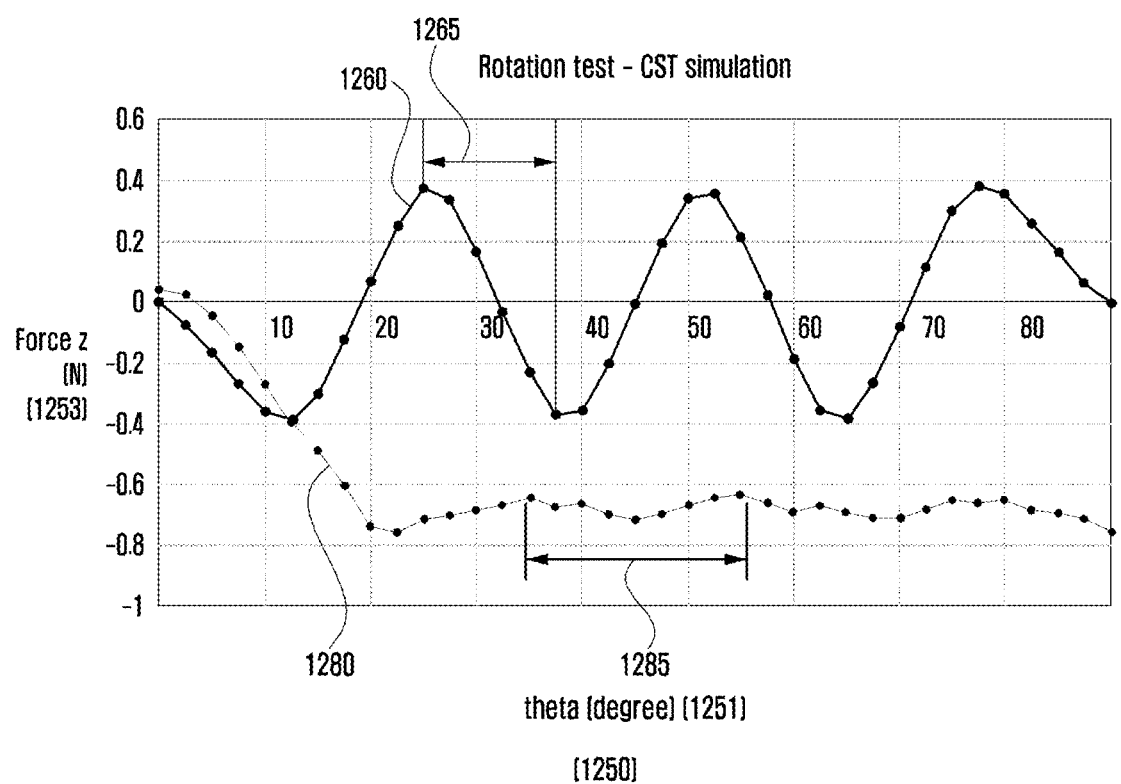

FIG. 12 is a diagram 1200 in which tensile forces according to an arrangement structure of a plurality of magnets included in the power reception device 520 and the power transmission device 530 are compared according to various embodiments.

FIG. 12 according to various embodiments is a diagram illustrating a case where rotation (e.g., the rotation of the power reception device 520 or the rotation of the power transmission device 530) occurs in the state in which a power reception device (e.g., the power reception device 520 in FIG. 5) and a power transmission device (e.g., the power transmission device 530 in FIG. 5) have been brought into contact with each other (or attached).

In a conventional arrangement structure 1220 of a plurality of magnets 473, 643a, and 643b included in the power reception device and the power transmission device illustrated in reference numeral <1210> of FIG. 12, each of the plurality of magnets of the power reception device may include a magnet having an N-S form, and each of the plurality of magnets of the power transmission device may include a magnet having an S-N form.

In an embodiment, in a graph illustrated in reference numeral <1250>, an x axis may indicate a rotation angle 1251, and a y axis may indicate a tensile force 1253.

In an embodiment, in the case of the conventional arrangement structure 1220, when rotation 1211 occurs in the state in which the magnet 473 of the power reception device and the magnets 643a and 643b of the power transmission device have been attached, a repulsive force (e.g., S-S or N-N) and attraction (e.g., N-S or S-N) may repeatedly occur. Accordingly, as in a graph 1260 illustrated in reference numeral <1250>, a tensile force between the power transmission device 530 and the power reception device 520 according to a rotation angle 1265 (e.g., about 12.9 degrees) may be great.

In an arrangement structure 1240 of the plurality of magnets 473ab, 473ab, 643a, 643b, 643ba, 643bb included in the power reception device 520 and the power transmission device 530 according to the disclosure, which is illustrated in reference numeral <1210> of FIG. 12, each of the plurality of magnets 473a included in the power reception device 520 and the plurality of magnets 643a and 643b included in the power transmission device 530 may form magnetism in a different direction. In an embodiment, the plurality of magnets may form slits 1243 (e.g., the slit 635 in FIG. 6B, or 6C) therebetween, and may be divided at intervals of a designated angle (e.g., about 22.5 degrees) and attached by the designated number of sections (e.g., 16 sections).

In an embodiment, in the case of the arrangement structure 1240 according to the disclosure, when rotation 1241 occurs in the state in which the magnet 473a of the power reception device 520 and the magnets 643a and 643b of the power transmission device 530 have been attached, as in a graph 1280 illustrated in reference numeral <1250>, a tensile force between the power transmission device 530 and the power reception device 520 according to a rotation angle 1285 (e.g., about 22.5 degrees) may be small. When the rotation 1241 occurs in the state in which the magnet 473a of the power reception device 520 and the magnets 643a and 643b of the power transmission device 530 have been attached, magnetism is formed in different directions. Accordingly, the power transmission device 530 can be prevented from being detached from the power reception device 520 because a steady tensile force between the power transmission device 530 and the power reception device 520 is formed in a vertical direction (e.g., in a z axis direction). Furthermore, a feeling of dialing can be formed because a tensile force of magnetism formed in an outside direction (e.g., the x axis direction) of the power reception device 520 (or the power transmission device 530) is changed during rotation 1241.

In various embodiments, the plurality of magnets may form the slits 1243 therebetween, and may be divided at intervals of about 22.5 degrees and attached to 16 sections. Due to this structure, a constant angle (e.g., 0 degree, 45 degrees, 90 degrees, . . . ) can be maintained in the state in which the power transmission device 530 has been attached to the power reception device 520 and a feeling of dialing can be formed even without an additional part in the power reception device 520. The number of plurality of magnets and/or an angle at which the plurality of magnets is disposed according to various embodiments are embodiments for facilitating the description, and the disclosure is not limited to the embodiments.

Figure 13A:
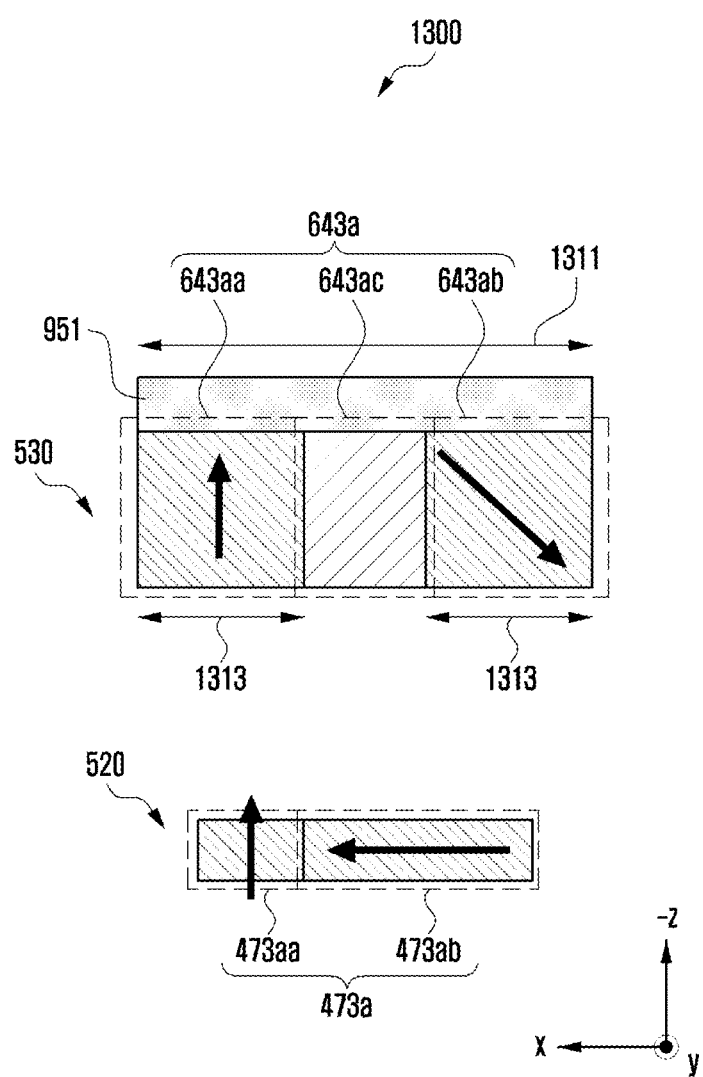
FIGS. 13A and 13B are diagrams illustrating a change in a tensile force and the amount of magnetic field interference according to the length of each of a plurality of magnets included in the power transmission device according to various embodiments.
Figure 13B:
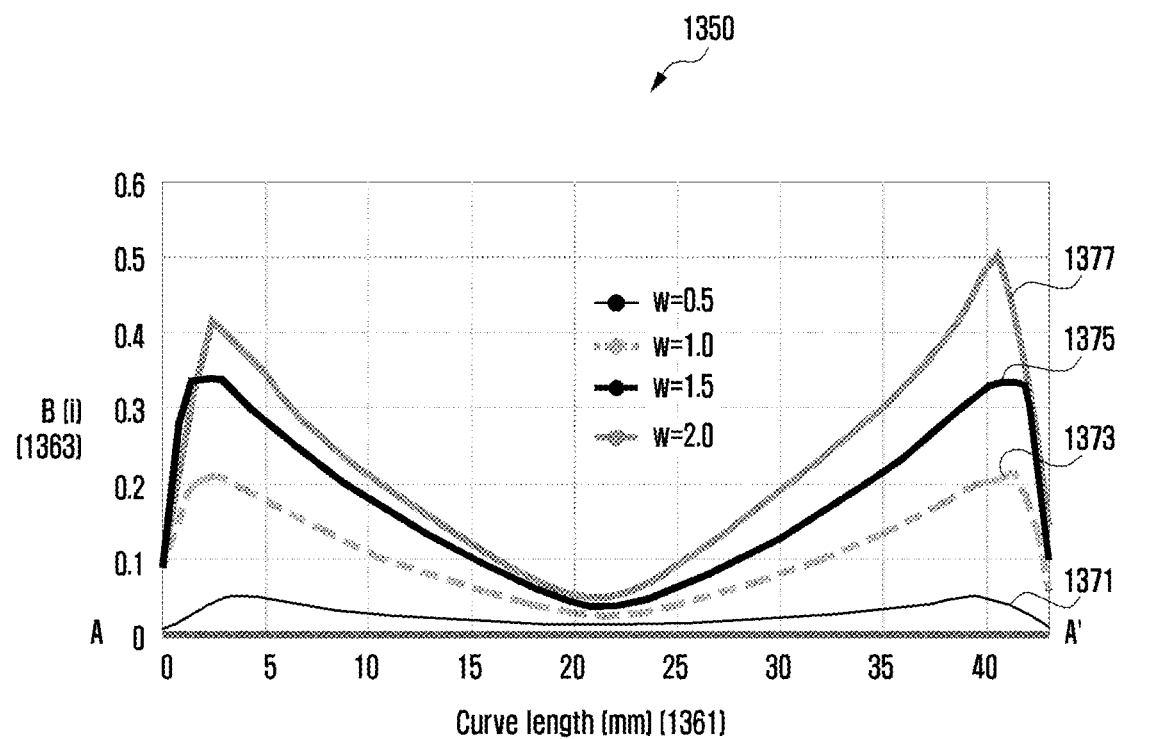
Figure 13B:
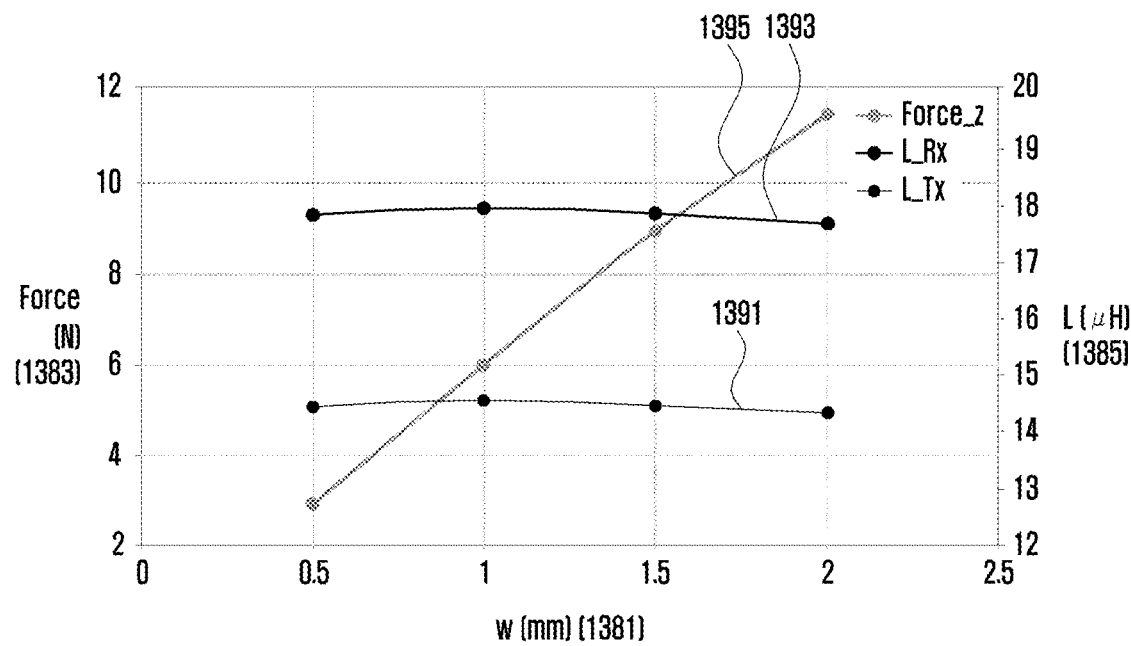

FIGS. 13A and 13B are diagrams 1300 and 1350 illustrating a change in a tensile force and the amount of magnetic field interference according to the length of each of a plurality of magnets included in the power transmission device 530 according to various embodiments.

With reference to FIG. 13A, a first magnet (e.g., the first magnet 643a in FIG. 8) disposed in a way to be adjacent to a coil antenna (e.g., the coil antenna 640 in FIG. 6D) of a power transmission device (e.g., the power transmission device 530 in FIG. 5) may include a (1-1)-th magnet 643aa and a (1-2)-th magnet 643ab. The (1-1)-th magnet 643aa of the first magnet 643a may be disposed in a way to be adjacent to the outermost coil of the coil antenna 640. A zone 643ac (e.g., the non-magnetized zone) in which a magnet is not disposed may be included between the first magnet 643a and the (1-2)-th magnet 643ab.

In an embodiment, the width of the first magnet 643a of the power transmission device 530 may have a first length 1311. The width of the (1-1)-th magnet 643aa and the width of the (1-2)-th magnet 643ab of the first magnet 643a may each have a second length 1313 smaller than the first length 1311.

FIG. 13B according to various embodiments illustrates a diagram illustrating the amount of magnetic field interference generated from the second shielding sheet 820 of the power transmission device 530 (e.g., the second shielding sheet 820 in FIG. 8) along line A-A' of FIG. 6D.

With reference to FIG. 13B, in a graph illustrated in reference numeral <1360>, an x axis may indicate the length 1361 of the second shielding sheet 820 of the power transmission device 530, and a y axis may indicate the amount of magnetic field interference 1363 of the second shielding sheet 820 of the power transmission device 530.

As illustrated in reference numeral <1360>, it may be seen that as the width of the (1-1)-th magnet 643aa and the width of the (1-2)-th magnet 643ab in an x direction (See FIG. 13A) each becomes smaller, the amount of magnetic field interference generated from the second shielding sheet 820 of the power transmission device 530 becomes smaller as in graphs <1377> (e.g., the width is about 0.5 millimeters (mm)), <1375> (e.g., about 1.0 mm), <1373> (e.g., about 1.5 mm), and <1371> (e.g., about 2.0 mm).

In an embodiment, if the width of the (1-1)-th magnet 643aa and the width of the (1-2)-th magnet 643ab each becomes smaller, this may mean that the width of the zone 643ac in which a magnet is not disposed becomes greater. In other words, as the width of the zone 643ac in which a magnet is not disposed becomes greater, the amount of magnetic field interference generated from the second shielding sheet 820 of the power transmission device 530 may become smaller.

In an embodiment, in a graph illustrated in reference numeral <1380>, an x axis may indicate the length 1381 of a magnet (e.g., the width of the (1-1)-th magnet 643aa and (1-2)-th magnet 643ab of the first magnet 643a), and a y axis may indicate a tensile force 1383 and inductance 1385 (unit: microhenries (μH)) between the power reception device 520 and the power transmission device 530.

In an embodiment, it may be seen that as the length 1381 of the width of the (1-1)-th magnet 643aa and the width of the (1-2)-th magnet 643ab becomes smaller, a tensile force 1383 between the power transmission device 530 and the power reception device 520 becomes greater as in a graph 1395.

In an embodiment, as in graphs 1391 and 1393, as the length 1381 of the width of the (1-1)-th magnet 643aa and the width of the (1-2)-th magnet 643ab becomes smaller, inductance 1385 of the power reception device 520 and inductance 1385 of the power transmission device 530 may become greater.

As described with reference to FIGS. 13A and 13B according to various embodiments, the length 1381 of the width of the (1-1)-th magnet 643aa and the width of the (1-2)-th magnet 643ab may be configured to become smaller as the tensile force 1383 between the power transmission device 530 and the power reception device 520 becomes greater and the inductance 1385 of the power reception device 520 and the inductance 1385 of the power transmission device 530 become greater, so that charging efficiency can be improved.

Figure 14A:
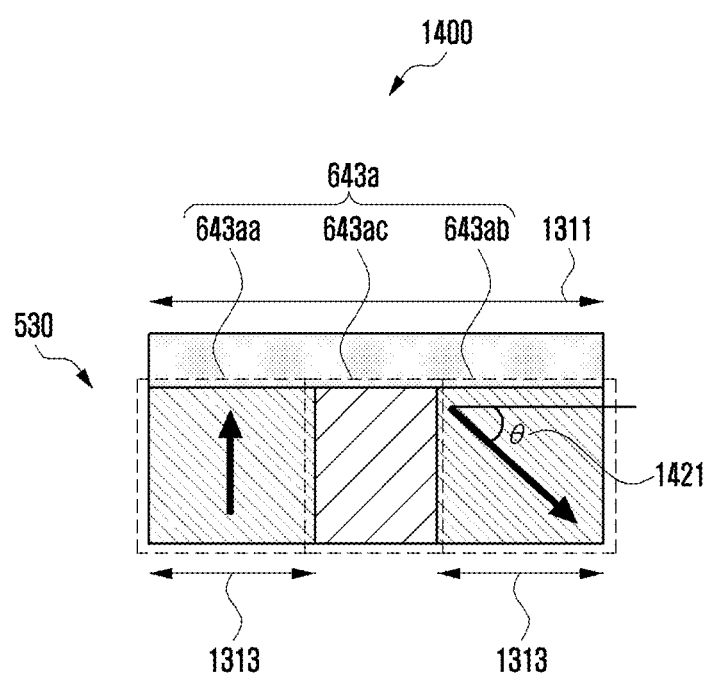
FIGS. 14A and 14B are diagrams illustrating a change in a tensile force and the amount of magnetic field interference according to rotation (e.g., the rotation of the power reception device or the rotation of the power transmission device) in the state in which the power reception device and the power transmission device have been brought into contact with each other (or attached) according to various embodiments.
Figure 14A:
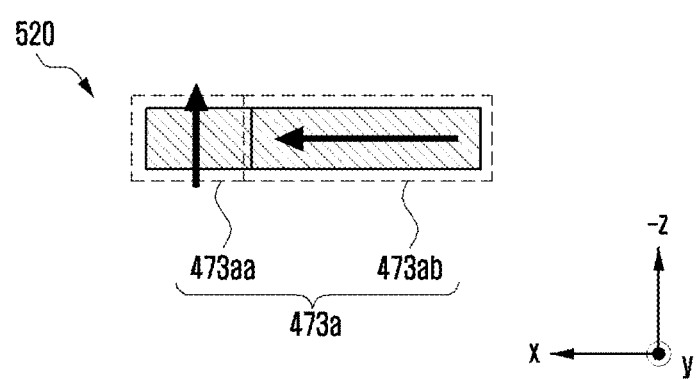
Figure 14B:
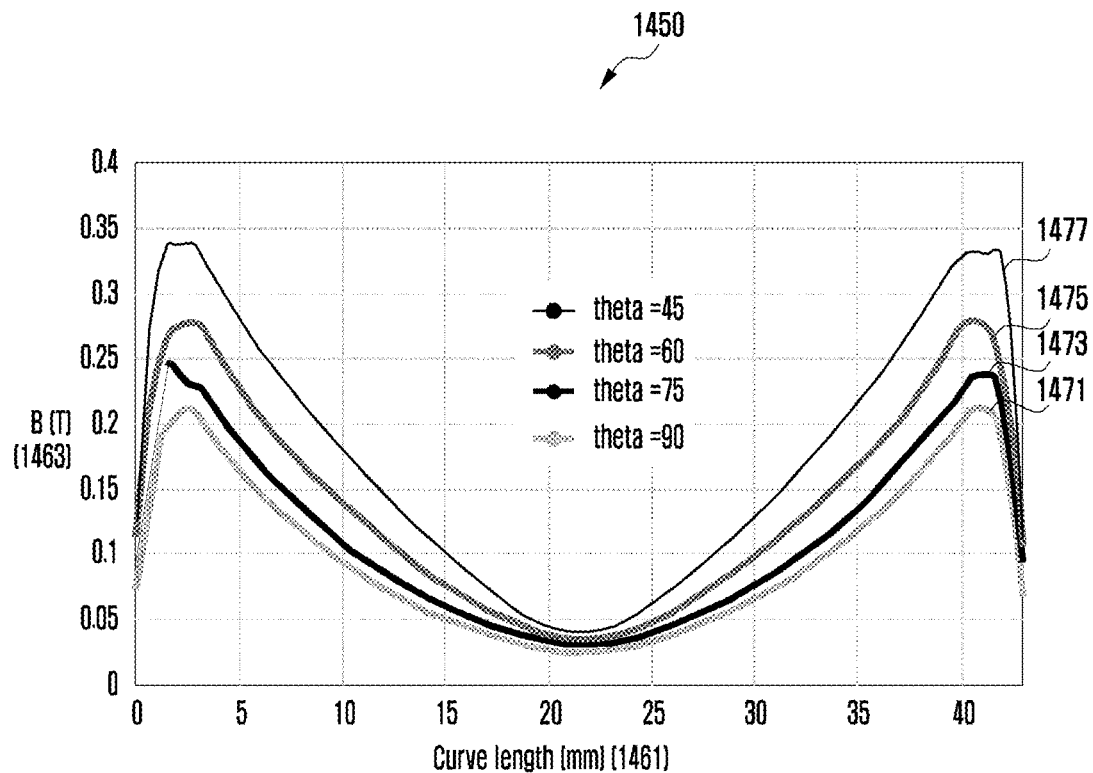
Figure 14B:
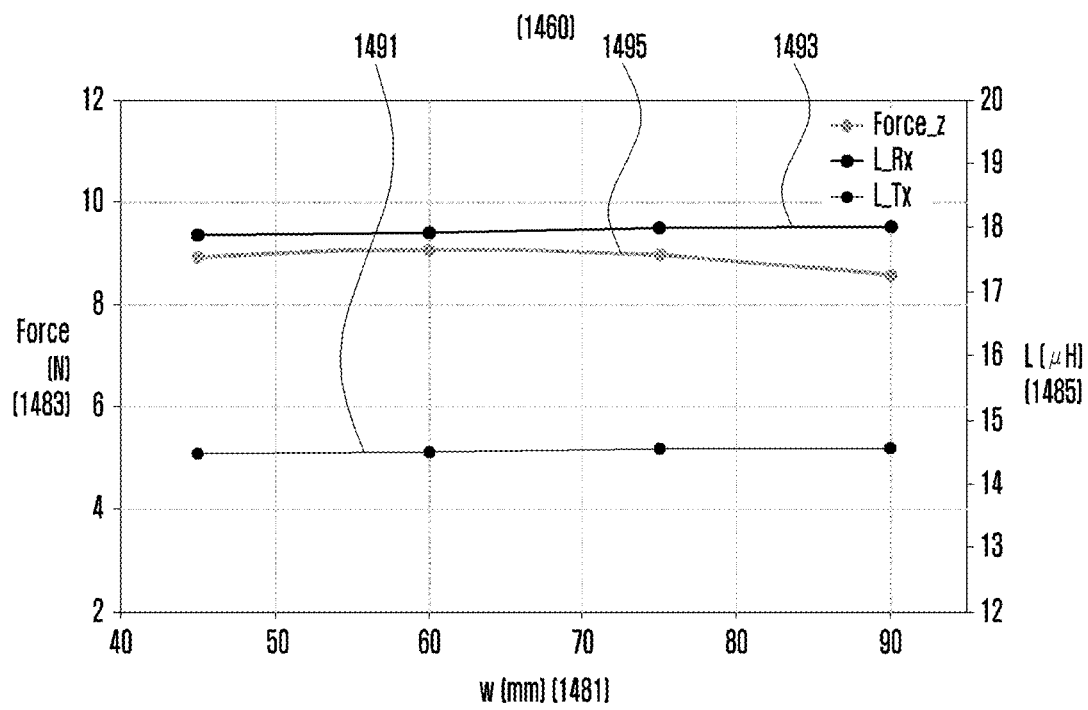

FIGS. 14A and 14B are diagrams 1400 and 1450 illustrating a change in a tensile force and the amount of magnetic field interference according to rotation (e.g., the rotation of the power reception device 520 or the rotation of the power transmission device 530) in the state in which the power reception device 520 and the power transmission device 530 have been brought into contact with each other (or attached) according to various embodiments.

The constituent elements of a power reception device (e.g., the power reception device 520 in FIG. 5) and a power transmission device (e.g., the power transmission device 530 in FIG. 5) illustrated in FIG. 14A according to various embodiments are the same as the constituent elements of the power reception device 520 and the power transmission device 530 illustrated in FIG. 13A, and a detailed description thereof may be omitted.

With reference to FIG. 14A, a rotation angle 1421 may be changed (e.g., changed from about 40 degrees to 90 degrees) due to the rotation of the power transmission device 530 in the state in which the power reception device 520 and the power transmission device 530 have been brought into contact with each other (or attached).

FIG. 14B according to various embodiments is the diagram 1450 illustrating a change in a tensile force between the power reception device 520 and the power transmission device 530 and the amount of magnetic field interference generated from the second shielding sheet 820 of the power transmission device 530, which were measured based on the rotation of the power transmission device 530 in the state in which the width of the (1-1)-th magnet 643aa and the width of the (1-2)-th magnet 643ab have a length of about 1.5 mm.

With reference to FIG. 14B, in a graph illustrated in reference numeral <1460>, an x axis may indicate the length 1461 of the second shielding sheet 820 of the power transmission device 530, and a y axis may indicate the amount of magnetic field interference 1463 of the second shielding sheet 820.

In an embodiment, it may be seen that as the rotation angle 1421 of the power transmission device 530 is increased, the amount of magnetic field interference generated from the second shielding sheet 820 of the power transmission device 530 becomes smaller as in graphs <1477> (e.g., about 45 degrees), <1475> (e.g., about 60 degrees), <1473> (e.g., about 75 degrees), and <1471> (e.g., about 90 degrees).

In an embodiment, in a graph illustrated in reference numeral <1480>, an x axis may indicate the length 1481 of a magnet (e.g., the width of the (1-1)-th magnet 643aa and (1-2)-th magnet 643ab of the first magnet 643a), and a y axis may indicate a tensile force 1483 and inductance 1485 between the power reception device 520 and the power transmission device 530.

In an embodiment, as in graphs <1491> and <1493>, as the rotation angle 1421 of the power transmission device 530 is increased, the inductance 1485 of the power reception device 520 and the inductance 1485 of the power transmission device 530 may become greater.

In an embodiment, it may be seen that as the rotation angle 1421 of the power transmission device 530 is increased, the tensile force 1483 between the power transmission device 530 and the power reception device 520 becomes greater as in a graph 1495.

Figure 15A:
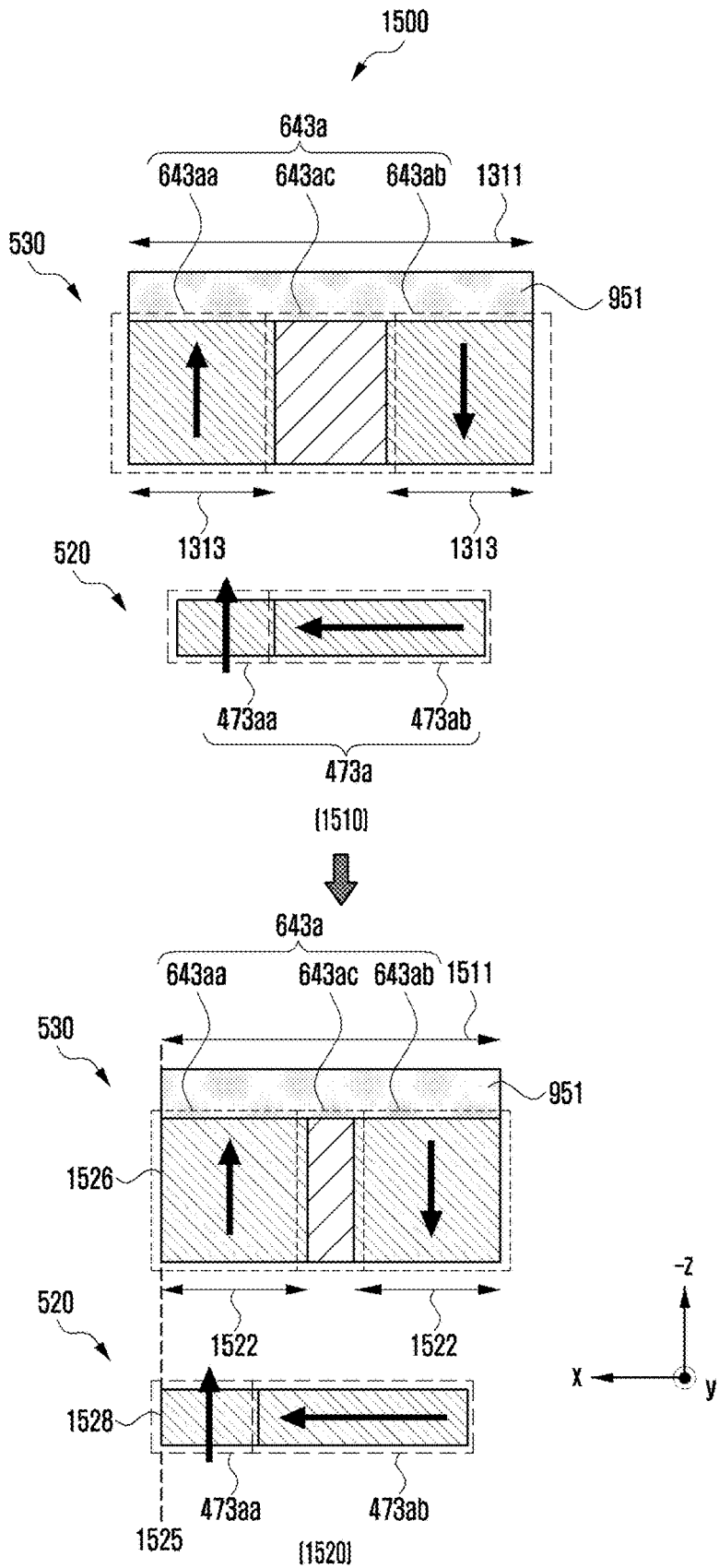
FIGS. 15A and 15B are diagrams illustrating a change in a tensile force and the amount of magnetic field interference according to the length of each of a plurality of magnets included in the power transmission device according to various embodiments.
Figure 15B:
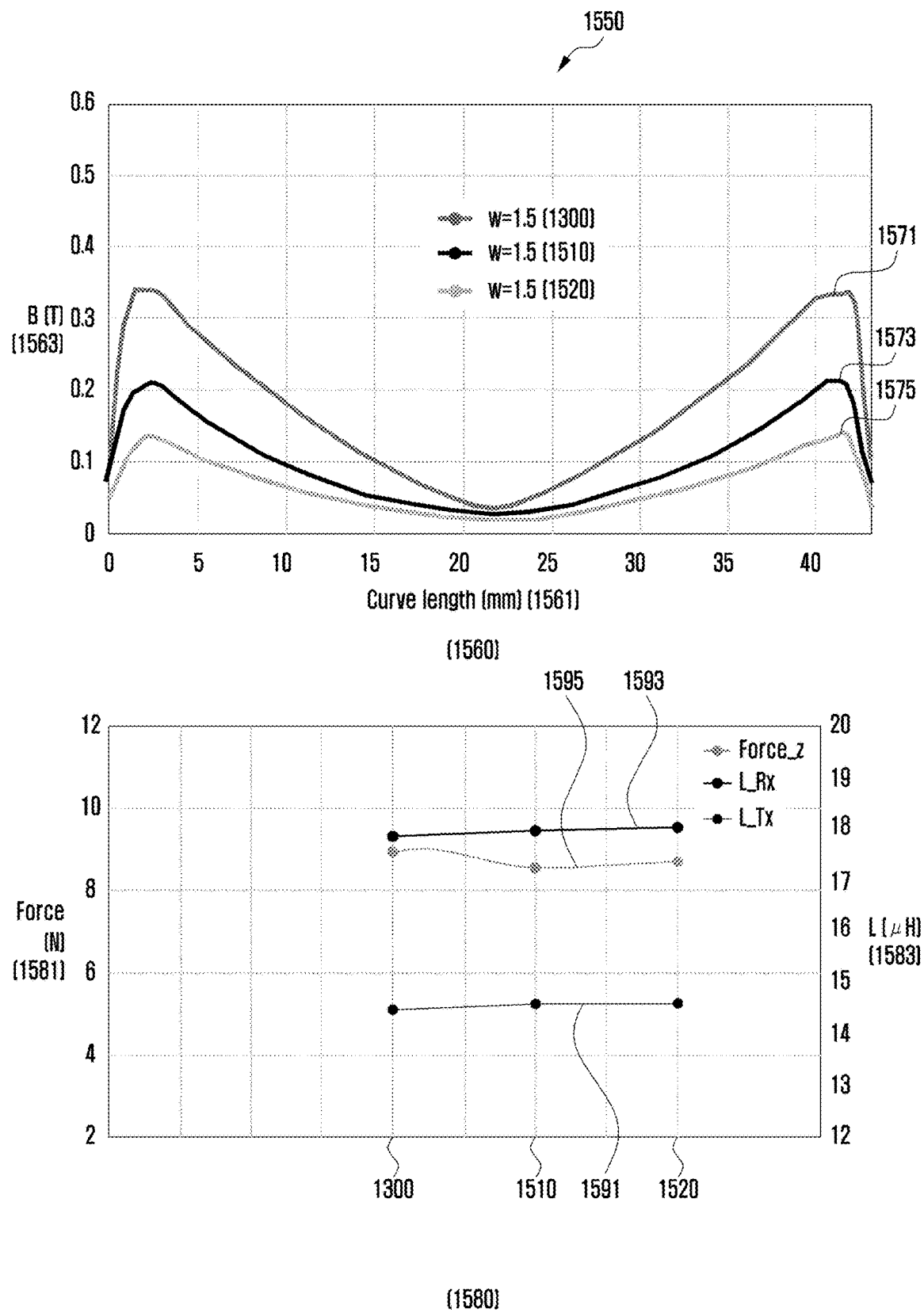

FIGS. 15A and 15B are diagrams 1500 and 1550 illustrating a change in a tensile force and the amount of magnetic field interference according to the length of each of a plurality of magnets included in the power transmission device 530 according to various embodiments.

With reference to FIG. 15A, as illustrated in reference numeral <1510> and <1520>, a first magnet (e.g., the first magnet 643a in FIG. 8) disposed in a way to be adjacent to a coil antenna (e.g., the coil antenna 640 in FIG. 6D) of a power transmission device (e.g., the power transmission device 530 in FIG. 5) may include a (1-1)-th magnet 643aa and a (1-2)-th magnet 643ab. The (1-1)-th magnet 643aa of the first magnet 643a may be disposed in a way to be adjacent to the outermost coil of the coil antenna 640. A zone 643ac (e.g., a non-magnetized zone) in which a magnet is not disposed may be included between the first magnet 643a and the (1-2)-th magnet 643ab.

In various embodiments, the width of the first magnet 643a of the power transmission device 530 illustrated in reference numeral <1510> may have a first length 1311. The width of the (1-1)-th magnet 643aa and width of the (1-2)-th magnet 643ab of the first magnet 643a may have a second length 1313 smaller than the first length.

In various embodiments, the width of the first magnet 643a of the power transmission device 530 illustrated in reference numeral <1520> may have a third length 1511 smaller than the first length 1311 and greater than the second length 1313. The width of the (1-1)-th magnet 643aa and width of the (1-2)-th magnet 643ab of the first magnet 643a may have a fourth length 1522 smaller than the third length 1511.

In various embodiments, compared to reference numeral <1510>, reference numeral <1520> may be a diagram in which an internal diameter of the first magnet 643a of the power transmission device 530 is made identical with an internal diameter of the first magnet 473a of the power reception device 520. For example, if the internal diameter of the first magnet 643a of the power transmission device 530 and the internal diameter of the first magnet 473a of the power reception device 520 are identical with each other, this may mean that one surface 1526 of the first magnet 643a of the power transmission device 530 and one surface 1528 of the first magnet 473a of the power reception device 520 are disposed on the same line on the basis of a line 1525.

FIG. 15B according to various embodiments is the diagram 1550 illustrating a change in a tensile force between the power reception device 520 and the power transmission device 530 and the amount of magnetic field interference of a second shielding sheet (e.g., the second shielding sheet 820 in FIG. 8) of the power transmission device 530, which were measured in the structure 1300 in FIG. 13A and the structures of reference numerals <1510> and <1520> of FIG. 15A.

With reference to FIG. 15B, in a graph illustrated in reference numeral <1560>, an x axis may indicate the length 1561 of the second shielding sheet 820 of the power transmission device 530, and a y axis may indicate the amount of magnetic field interference 1563 of the second shielding sheet 820 of the power transmission device 530.

In an embodiment, a graph 1571 indicates the amount of magnetic field interference generated from the second shielding sheet 820 of the power transmission device 530 in the structure 1300 in FIG. 13A. A graph 1573 indicates the amount of magnetic field interference generated from the second shielding sheet 820 of the power transmission device 530 in the structure of reference numeral <1510> of FIG. 15A. A graph 1575 indicates the amount of magnetic field interference generated from the second shielding sheet 820 of the power transmission device 530 in the structure of reference numeral <1520> of FIG. 15A.

As in the graph 1575 according to the structure of reference numeral <1520> of FIG. 15A among the aforementioned structures, it may be seen that the amount of magnetic field interference generated from the second shielding sheet 820 of the power transmission device 530 is small. In other words, if the internal diameter of the first magnet 643a of the power transmission device 530 is made identical with the internal diameter of the first magnet 473a of the power reception device 520, charging efficiency can be improved because magnetism introduced into the second shielding sheet 820 of the power transmission device 530 becomes smaller.

In an embodiment, a graph illustrated in reference numeral <1580> illustrates a tensile force 1581 and inductance 1583 between the power reception device 520 and the power transmission device 530 in the structure 1300 in FIG. 13A and the structures of reference numerals <1510> and <1520> of FIG. 15A.

In an embodiment, it may be seen that the inductance 1485 of the power reception device 520 and the inductance 1583 of the power transmission device 530 become greater in the structure of reference numeral <1520> of FIG. 15A among the aforementioned structures as in graphs <1591> and <1593>.

In an embodiment, it may be seen that the tensile force 1581 between the power transmission device 530 and the power reception device 520 becomes great in the structure of reference numeral <1520> of FIG. 15A among the aforementioned structures as in a graph 1595.

In other words, if the internal diameter of the first magnet 643a of the power transmission device 530 is made identical with the internal diameter of the first magnet 473a of the power reception device 520, charging efficiency can be improved because not only the tensile force 1581 between the power transmission device 530 and the power reception device 520, but the inductance 1485 of the power reception device 520 and the inductance 1583 of the power transmission device 530 become greater.

Figure 16:
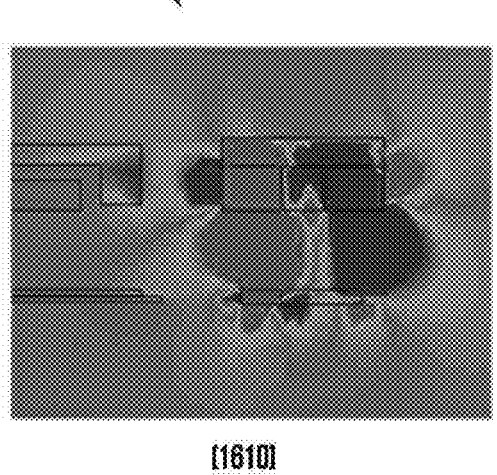
FIG. 16 is a diagram illustrating radiation patterns according to the structures of FIGS. 13A and 15A according to various embodiments.
Figure 16:
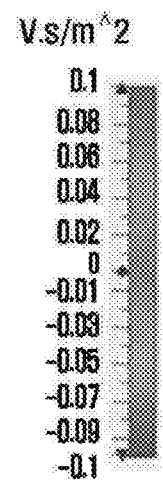
Figure 16:
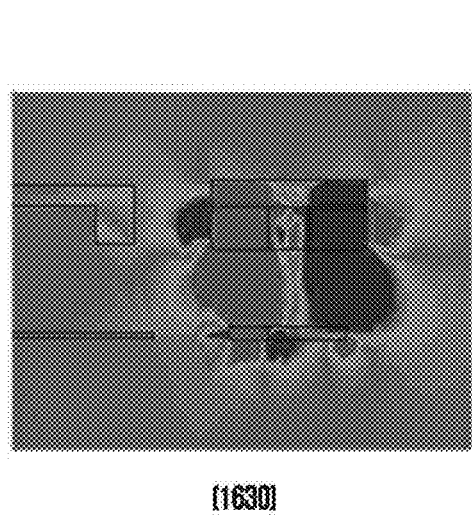
Figure 16:
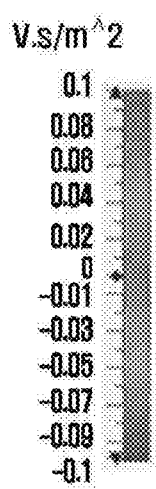
Figure 16:
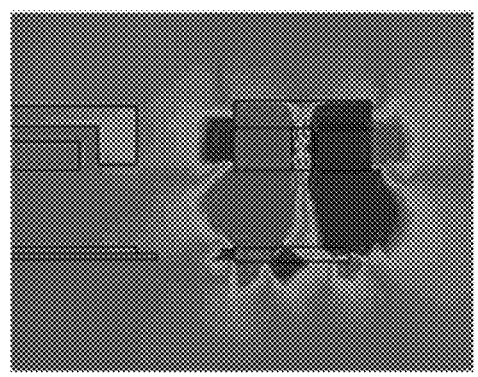
Figure 16:
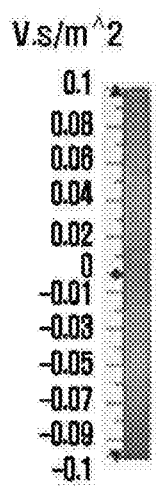
Figure 16:
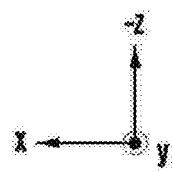

FIG. 16 is a diagram 1600 illustrating radiation patterns according to the structures of FIGS. 13A and 15A according to various embodiments.

In an embodiment, reference numeral <1610> illustrates a radiation pattern in the structure 1300 in FIG. 13A, reference numeral <1630> illustrates a radiation pattern in the structure of reference numeral <1510> of FIG. 15A, and reference numeral <1650> illustrates a radiation pattern in the structure of reference numeral <1520> of FIG. 15A.

In various embodiments, a red zone (i.e., light color at black and white version) illustrates that magnetism is formed in a first direction (e.g., a −z axis direction), and a blue zone (i.e., dark color at black and white version) illustrates that magnetism is formed in a second direction (e.g., a z axis direction), that is, a direction opposite to the first direction.

As illustrated in reference numerals <1610>, <1630>, and <1650> according to various embodiments of the structure 1300 in FIG. 13A and the structures of reference numerals <1510> and <1520> of FIG. 15A, magnetism introduced into a first shielding sheet (e.g., the first shielding sheet 810 in FIG. 8) of a power reception device (e.g., the power reception device 520 in FIG. 5) and a second shielding sheet (e.g., the second shielding sheet 820 in FIG. 8) of a power transmission device (e.g., the power transmission device 530 in FIG. 5) can become smaller, and magnetism can also be prevented from being induced in an outside direction (e.g., the −x axis direction) of the power reception device 520 (and/or the power transmission device 530). Accordingly, the coil antenna 470 of the power reception device 520 and the coil antenna 640 of the power transmission device 530 can be disposed in a way to be aligned with each other. As the coil antenna 470 of the power reception device 520 and the coil antenna 640 of the power transmission device 530 are disposed in a way to be aligned with each other, charging efficiency can be improved.

The power reception device 520 according to various embodiments may include: a housing (e.g., the housing 310 in FIG. 3A) including a first surface (e.g., the first surface 310A in FIG. 3A) facing in a first direction (e.g., a z axis direction), a second surface (e.g., the second surface 310B in FIG. 3B) facing in a second direction (e.g., a −z axis direction) opposite to the first direction, and a side surface (e.g., the lateral surface 310C in FIG. 3A) surrounding a space between the first surface 310A and the second surface 310B; a coil antenna (e.g., the coil antenna 470 in FIG. 6A, 6B, or 6C) disposed in an internal space of the housing 310, configured to wirelessly receive power from the power transmission device 530, and wound in a circle; a shielding sheet (e.g., the first shielding sheet 810 in FIG. 8) disposed over the coil antenna 470; and a first magnet (e.g., 473aa or 473ba in FIG. 8) and a second magnet (e.g., 473ab or 473bb in FIG. 8) adjacent to the outermost coil of the coil antenna 470 and disposed to be spaced apart from the outermost coil. The first magnet 473aa or 473ba may be disposed so that a portion of magnetism induced by the first magnet 473aa or 473ba is formed in the first direction (e.g., the z axis direction), and the second magnet 473ab or 473bb may be coupled with the first magnet 473aa or 473ba and may be disposed so that a portion of the magnetism induced by the second magnet 473ab or 473bb is formed in a third direction (i.e., certain direction perpendicular to the z axis direction such as an −x axis direction, an x axis direction, a y axis direction, or a −y axis direction) that is an outside direction from a center of the coil antenna 470.

In various embodiments, the first magnet 473aa or 473ba may be provided in plural. The second magnet 473ab or 473bb may be provided in plural. A slit (e.g., the slit 635 in FIG. 6B) may be formed between adjacent second magnets of the plurality of second magnets.

In various embodiments, when the power transmission device 530 is attached to the power reception device 520, the coil antenna 470 of the power reception device 520 and a coil antenna (e.g., the coil antenna 640 in FIG. 6D) of the power transmission device 530 may be disposed in a way to be aligned with each other due to coupling between the plurality of first magnets and plurality of second magnets of the power reception device 520 and a plurality of third magnets and plurality of fourth magnets of the power transmission device 530.

In various embodiments, the second magnet 473ab or 473bb may have a rectangular shape (e.g., the shape in FIGS. 6A and 6B) or a trapezoidal shape (e.g., the shape in FIG. 6C).

In various embodiments, the second magnet 473ab or 473bb may be disposed so that the portion of the magnetism induced by the second magnet 473ab or 473bb is formed in a fourth direction (e.g., a direction between the −x axis and the −z axis or a direction between the x axis and the −z axis), that is a direction between the second direction and the third direction.

The power reception device 520 according to various embodiments may further include a third magnet (e.g., the third magnet 473bc in reference numeral <970> of FIG. 9) coupled with the second magnet 473ab or 473bb and disposed so that a portion of the magnetism induced by the third magnet is formed in a second direction (e.g., the −z axis direction).

In various embodiments, the second magnet 473ab or 473bb may be disposed to be spaced apart from the first magnet 473aa or 473ba at a designated distance in a third direction (e.g., certain direction perpendicular to the z axis direction such as an −x axis direction, an x axis direction, a y axis direction, or a −y axis direction). The first magnet and the second magnet 473ab or 473bb may have a non-magnetized zone (not illustrated) therebetween.

The power reception device 520 according to various embodiments may further include at least one shielding material (not illustrated) disposed on one surface of the first magnet 473aa or 473ba and/or the second magnet 473ab or 473bb and for guiding the magnetism.

In various embodiments, as the at least one shielding material (not illustrated) for guiding the magnetism is disposed on the one surface of the first magnet 473aa or 473ba and/or the second magnet 473ab or 473bb so that the magnetism may be prevented from being induced in an outside direction of the power reception device 520.

In various embodiments, the at least one shielding material (not illustrated) may be formed of a steel plate.

The power transmission device 530 according to various embodiments may include a housing (e.g., the housing 535 in FIG. 6D) including a first surface (e.g., the first surface 535A in FIG. 6D) facing in a first direction (e.g., a z axis direction), a second surface (e.g., the second surface 535B in FIG. 6D) facing in a second direction (e.g., a −z axis direction) opposite to the first direction, and a side surface (e.g., the side surface 535C in FIG. 6D) surrounding a space between the first surface and the second surface; a coil antenna 640 disposed in an internal space of the housing 535, configured to wirelessly transmit power to the power reception device 520, and wound in a circle; a shielding sheet (e.g., the second shielding sheet 820 in FIG. 8) disposed under the coil antenna 640; and a first magnet (e.g., 643aa or 643ba in FIG. 8) and a second magnet (e.g., 643ab or 643bb in FIG. 8) adjacent to the outermost coil of the coil antenna 640 and disposed to be spaced apart from the outermost coil. The first magnet 643aa or 643ba may be disposed so that a portion of magnetism induced by the first magnet 643aa or 643ba is formed in a first direction (e.g., the z axis direction). The second magnet 643ab or 643bb may be coupled with the first magnet 643aa or 643ba in a third direction (i.e., a certain direction perpendicular to the z axis direction such as an x axis direction, an −x axis direction, a y axis direction, or a −y axis direction) that is an outside direction from a center of the coil antenna 640 and may be disposed so that a portion of the magnetism induced by the second magnet 643ab or 643bb is formed in a fourth direction (i.e., an −x axis direction, an x axis direction, a −y axis direction, or a y axis direction) that is opposite to the third direction.

In various embodiments, the first magnet 643aa or 643ba may be provided in plural, the second magnet 643ab or 643bb may be provided in plural, and a slit (not illustrated) may be formed between adjacent second magnets of the plurality of second magnets.

In various embodiments, when the power reception device 520 is attached to the power transmission device 530, the coil antenna 640 of the power transmission device 530 and the coil antenna 470 of the power reception device 520 may be disposed in a way to be aligned with each other due to coupling between the plurality of first magnets and plurality of second magnets of the power transmission device 530 and a plurality of third magnets and plurality of fourth magnets of the power reception device 520.

In various embodiments, the second magnet 643ab or 643bb may have a rectangular shape or a trapezoidal shape.

In various embodiments, the second magnet 643ab or 643bb may be disposed so that the portion of the magnetism induced by the second magnet is formed in fourth fifth direction (e.g., a direction between the x axis and the −z axis or a direction between the −x axis and the −z axis), that is, that is a direction between the second direction and the fourth direction.

The power transmission device 530 according to various embodiments may further include a third magnet (e.g., the third magnet 643bc in reference numeral <970> of FIG. 9) coupled with the second magnet 643ab or 643bb and disposed so that a portion of the magnetism induced by the third magnet is formed in a second direction (e.g., the −z axis direction).

In various embodiments, the second magnet 643ab or 643bb may be disposed to be spaced apart from the first magnet 643aa or 643ba at a designated distance in a third direction (e.g., the x axis direction or the −x axis direction). The first magnet 643aa or 643ba and the second magnet 643ab or 643bb may have a non-magnetized zone (e.g., the non-magnetized zone 643bd in reference numeral <990> of FIG. 9) therebetween.

The power transmission device 530 according to various embodiments may further include at least one shielding material (e.g., the shielding material 911 and 951 in reference numeral <910> and <950> of FIG. 9) disposed on one surface of the first magnet 643aa or 643ba and/or the second magnet 643ab or 643bb and for guiding the magnetism.

In various embodiments, as the at least one shielding material 911, 951 for guiding the magnetism is disposed on the one surface of the first magnet 643aa or 643ba and/or the second magnet 643ab or 643bb so that the magnetism may be prevented from being induced in an outside direction of the power transmission device 530.

In various embodiments, the at least one shielding material 911, 951 may be formed of a steel plate.

Various embodiments disclosed in this specification and drawings have merely presented specific examples in order to easily describe technical contents of the disclosure and to help understanding of the disclosure, but are not intended to limit the scope of the disclosure. Accordingly, all changes or modified forms derived based on the technical spirit of the disclosure should be construed as being included in the scope of the disclosure in addition to the embodiments disclosed herein.

The invention claimed is:
1. A power reception device comprising:
a housing comprising a first surface facing in a first direction, a second surface facing in a second direction opposite to the first direction, and a side surface surrounding a space between the first surface and the second surface;
a coil antenna disposed in an internal space of the housing, configured to wirelessly receive power from a power transmission device, and wound in a circle;
a shielding sheet disposed over the coil antenna; and a first magnet and a second magnet adjacent to an outermost coil of the coil antenna and disposed to be spaced apart from the outermost coil, wherein the first magnet is disposed so that a portion of magnetism induced by the first magnet is formed in the first direction, and the second magnet is coupled with the first magnet in a third direction that is an outside direction from a center of the coil antenna and is disposed so that a portion of the magnetism induced by the second magnet is formed in the third direction.

2. The power reception device of claim 1,
wherein the first magnet is provided in plural,
wherein the second magnet is provided in plural, and
wherein a slit is formed between adjacent second magnets of the plurality of second magnets.

3. The power reception device of claim 2, wherein based on the power transmission device being attached to the power reception device, the coil antenna of the power reception device and a coil antenna of the power transmission device are disposed in a way to be aligned with each other due to coupling between the plurality of first magnets and plurality of second magnets of the power reception device and a plurality of third magnets and plurality of fourth magnets of the power transmission device.

4. The power reception device of claim 1, wherein the second magnet has a rectangular shape or a trapezoidal shape.

5. The power reception device of claim 1, wherein the second magnet is disposed so that the portion of the magnetism induced by the second magnet is formed in a fourth direction that is a direction between the second direction and the third direction.

6. The power reception device of claim 1, further comprising a third magnet coupled with the second magnet and disposed so that a portion of the magnetism induced by the third magnet is formed in the second direction.

7. The power reception device of claim 1,
wherein the second magnet is disposed to be spaced apart from the first magnet at a designated distance in the third direction, and
wherein the first magnet and the second magnet have a non-magnetized zone therebetween.

8. The power reception device of claim 1, further comprising at least one shielding material disposed on one surface of the first magnet and/or the second magnet and for guiding the magnetism.

9. The power reception device of claim 8, wherein as the at least one shielding material for guiding the magnetism is disposed on the one surface of the first magnet and/or the second magnet so that the magnetism is prevented from being induced in an outside direction of the power reception device.

10. The power reception device of claim 8, wherein the at least one shielding material is formed of a steel plate.

11. A power transmission device comprising:
a housing comprising a first surface facing in a first direction, a second surface facing in a second direction opposite to the first direction, and a side surface surrounding a space between the first surface and the second surface;
a coil antenna disposed in an internal space of the housing, configured to wirelessly transmit power to a power reception device, and wound in a circle;
a shielding sheet disposed under the coil antenna; and
a first magnet and a second magnet adjacent to an outermost coil of the coil antenna and disposed to be spaced apart from the outermost coil, wherein the first magnet is disposed so that a portion of magnetism induced by the first magnet is formed in the first direction, and the second magnet is coupled with the first magnet in a third direction that is an outside direction from a center of the coil antenna and is disposed so that a portion of the magnetism induced by the second magnet is formed in a fourth direction that is opposite to the third direction.

12. The power transmission device of claim 11,
wherein the first magnet is provided in plural,
wherein the second magnet is provided in plural, and
wherein a slit is formed between adjacent second magnets of the plurality of second magnets.

13. The power transmission device of claim 12, wherein based on the power reception device being attached to the power transmission device, the coil antenna of the power transmission device and a coil antenna of the power reception device are disposed in a way to be aligned with each other due to coupling between the plurality of first magnets and plurality of second magnets of the power transmission device and a plurality of third magnets and plurality of fourth magnets of the power reception device.

14. The power transmission device of claim 11, wherein the second magnet has a rectangular shape or a trapezoidal shape.

15. The power transmission device of claim 11, wherein the second magnet is disposed so that the portion of the magnetism induced by the second magnet is formed in a fifth direction that is a direction between the second direction and the fourth direction.

16. The power transmission device of claim 11, further comprising a third magnet coupled with the second magnet and disposed so that a portion of the magnetism induced by the third magnet is formed in the second direction.

17. The power transmission device of claim 11,
wherein the second magnet is disposed to be spaced apart from the first magnet at a designated distance in the third direction, and
wherein the first magnet and the second magnet have a non-magnetized zone therebetween.

18. The power transmission device of claim 11, further comprising at least one shielding material disposed on one surface of the first magnet and/or the second magnet and for guiding the magnetism.

19. The power transmission device of claim 18, wherein as the at least one shielding material for guiding the magnetism is disposed on the one surface of the first magnet and/or the second magnet so that the magnetism is prevented from being induced in an outside direction of the power transmission device.

20. The power transmission device of claim 18, wherein the at least one shielding material is formed of a steel plate.

* * * * *